(12) United States Patent
Karito

(10) Patent No.: US 7,570,820 B2
(45) Date of Patent: Aug. 4, 2009

(54) IMAGE PROCESSING APPARATUS, IMAGE PROCESSING METHOD, IMAGE PROCESSING PROGRAM AND RECORDING MEDIUM FOR RECORDING PROGRAM

(75) Inventor: Nobuhiro Karito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 774 days.

(21) Appl. No.: 11/220,373

(22) Filed: Sep. 6, 2005

(65) Prior Publication Data

US 2006/0082830 A1  Apr. 20, 2006

(30) Foreign Application Priority Data

Oct. 18, 2004  (JP) .............................. 2004-302468

(51) Int. Cl.
*G06K 9/36* (2006.01)

(52) U.S. Cl. ...................................... 382/232

(58) Field of Classification Search ................. 382/232, 382/237, 239–240, 242, 243, 248, 251; 348/395.1, 348/403.1, 420.1; 358/240.18, 240.24; 375/448, 375/453

See application file for complete search history.

(56) References Cited

U.S. PATENT DOCUMENTS 5,157,743 A * 10/1992 Maeda et al. ............... 382/248
5,282,255 A * 1/1994 Bovik et al. ................. 382/239
5,384,868 A * 1/1995 Maeda et al. ............... 382/240
5,923,376 A * 7/1999 Pullen et al. ............ 375/240.16
6,075,902 A * 6/2000 Kojima ...................... 382/260

FOREIGN PATENT DOCUMENTS

JP  11-027528  1/1999

OTHER PUBLICATIONS

Toshiya Kurosawa et al., "Peripheral Brightness Accumulation Redistribution" (CAPIX method) pseudo intermediate grayscale processor, Institute of Image Electronics Engineers of Japan, 17th Volume, Fifth Issue (1988) pp. 361-368.

* cited by examiner

*Primary Examiner*—Jose L Couso
(74) *Attorney, Agent, or Firm*—Hogan & Hartson LLP

(57) ABSTRACT

An image processing apparatus comprises a pixel group reference point determination unit 64 that divides the input image data into predetermined pixel groups and determines a position of a reference point from the grayscale values of respective pixels contained in the pixel groups; a pixel group expansion processing unit 65 that takes grayscale values of the part that is less than a threshold value from unprocessed pixels in the periphery of the pixel group to the pixel group if the sum total of the grayscale values of the respective pixels contained in the pixel group is less than the threshold value; and a quantization data supply unit 66 that supplies the quantization data to a pixel on the basis of the position of the reference point determined by the pixel group reference point determination unit 64.

9 Claims, 20 Drawing Sheets

UPPER LEFT EDGE CELL BLOCK

UPPER EDGE CELL BLOCK

LEFT EDGE CELL BLOCK

NORMAL REGION CELL BLOCK

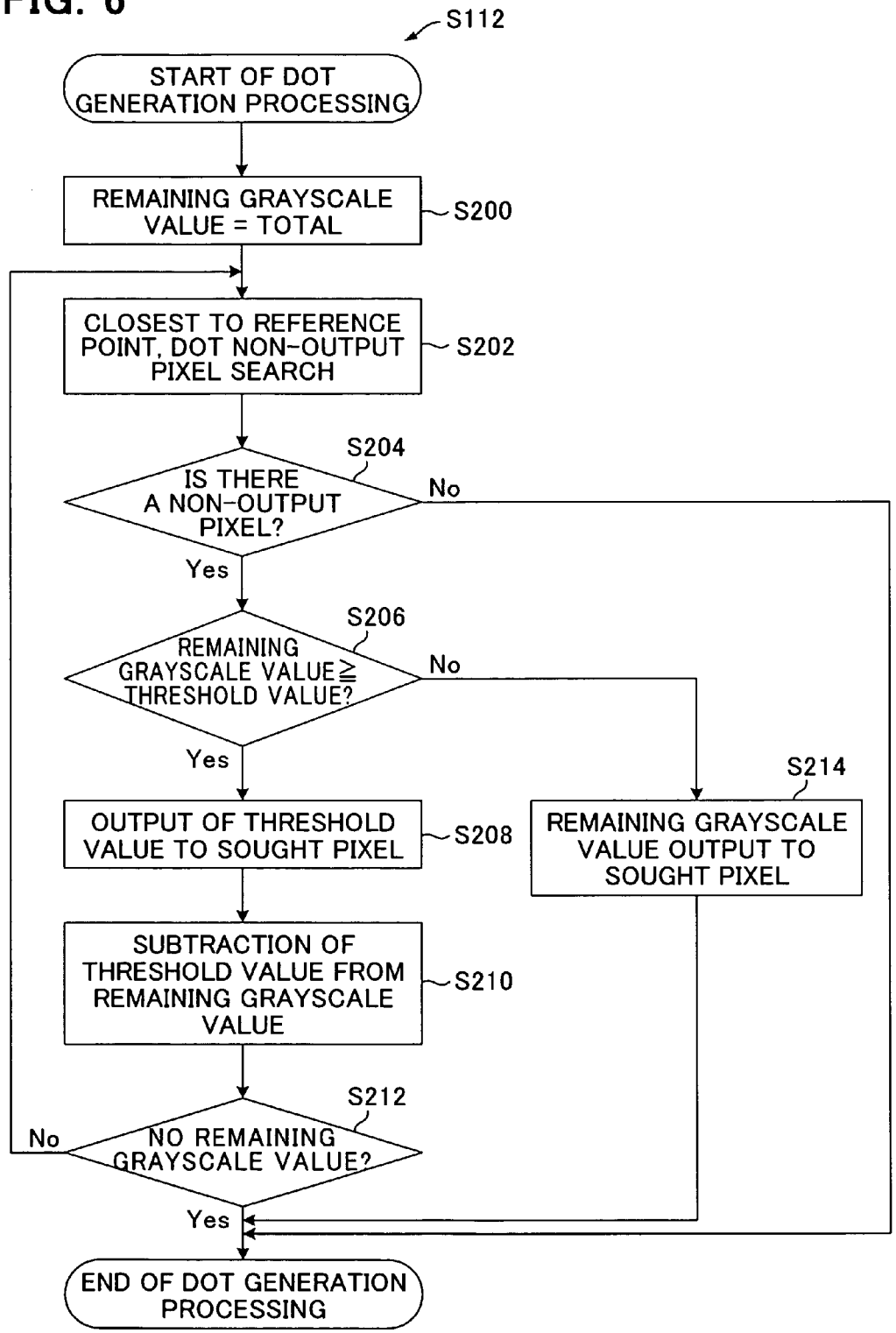

FIG. 7(A)

INPUT BUFFER 72

|   | 0 | 1 | 2 | 3 | 4 | 5 |
|---|---|---|---|---|---|---|
| 0 | 80 | 80 | 20 | 20 | 20 | 80 |
| 1 | 80 | 20 | 20 | 20 | 80 | 80 |
| 2 | 20 | 20 | 20 | 80 | 80 | 20 |
| 3 | 20 | 20 | 80 | 80 | 20 | 20 |
| 4 | 20 | 80 | 80 | 20 | 20 | 20 |
| 5 | 80 | 80 | 20 | 20 | 20 | 80 |

WORK BUFFER 76

| Tn |  |
|---|---|
| Gx |  |
| Gy |  |

RAM44

FIG. 7(B)

INPUT BUFFER 72

|   | 0 | 1 | 2 | 3 | 4 | 5 |
|---|---|---|---|---|---|---|
| 0 | 240 | 0 | 20 | 20 | 20 | 80 |
| 1 | 0 | 20 | 20 | 20 | 80 | 80 |
| 2 | 20 | 20 | 20 | 80 | 80 | 20 |
| 3 | 20 | 20 | 80 | 80 | 20 | 20 |
| 4 | 20 | 80 | 80 | 20 | 20 | 20 |
| 5 | 80 | 80 | 20 | 20 | 20 | 80 |

REFERENCE POINT → (0,0)

WORK BUFFER 76

| Tn | 240 |
|---|---|
| Gx | 0.33 |
| Gy | 0.33 |

FIG. 7(C)

INPUT BUFFER 72

|   | 0 | 1 | 2 | 3 | 4 | 5 |
|---|---|---|---|---|---|---|
| 0 | 255 | 0 | 20 | 20 | 20 | 80 |
| 1 | 0 | (5) | 20 | 20 | 80 | 80 |
| 2 | 20 | 20 | 20 | 80 | 80 | 20 |
| 3 | 20 | 20 | 80 | 80 | 20 | 20 |
| 4 | 20 | 80 | 80 | 20 | 20 | 20 |
| 5 | 80 | 80 | 20 | 20 | 20 | 80 |

WORK BUFFER 76

| Tn | 255 |
|---|---|
| Gx | 0.37 |
| Gy | 0.37 |

FIG. 8(A)

RAM44

INPUT BUFFER 72

|   | 0 | 1 | 2 | 3 | 4 | 5 |
|---|---|---|---|---|---|---|
| 0 | 255 | 0 | 0 | 0 | 0 | 255 |
| 1 | 0 | 5 | 20 | 0 | 0 | 65 |
| 2 | 20 | 20 | 20 | 80 | 80 | 20 |
| 3 | 20 | 20 | 80 | 80 | 20 | 20 |
| 4 | 20 | 80 | 80 | 20 | 20 | 20 |
| 5 | 80 | 80 | 20 | 20 | 20 | 80 |

WORK BUFFER 76

| Tn |  |
|---|---|
| Gx |  |
| Gy |  |

FIG. 8(B)

INPUT BUFFER 72

|   | 0 | 1 | 2 | 3 | 4 | 5 |
|---|---|---|---|---|---|---|
| 0 | 255 | 0 | 0 | 0 | 0 | 255 |
| 1 | 0 | 0 | 0 | 0 | 0 | 65 |
| 2 | 0 | 0 | 0 | 0 | 80 | 20 |
| 3 | 0 | 0 | 525 | 0 | 20 | 20 |
| 4 | 20 | 0 | 0 | 20 | 20 | 20 |
| 5 | 80 | 80 | 20 | 20 | 20 | 80 |

REFERENCE POINT

WORK BUFFER 76

| Tn | 525 |
|---|---|
| Gx | 1.91 |
| Gy | 2.94 |

FIG. 8(C)

| | 0 | 1 | 2 | 3 | 4 | 5 |
|---|---|---|---|---|---|---|
| 0 | 255 | 0 | 0 | 0 | 0 | 255 |
| 1 | 0 | 0 | 0 | 0 | 0 | 65 |
| 2 | 0 | 0 | 255 | 0 | 80 | 20 |
| 3 | 0 | 15 | 255 | 0 | 20 | 20 |
| 4 | 20 | 0 | 0 | 20 | 20 | 20 |
| 5 | 80 | 80 | 20 | 20 | 20 | 80 |

INPUT BUFFER 72

WORK BUFFER 76

| Tn | |
|---|---|
| Gx | |
| Gy | |

FIG. 11(A) UPPER LEFT EDGE CELL BLOCK (-18 DEGREES)

FIG. 11(B) UPPER CELL BLOCK (-18 DEGREES)

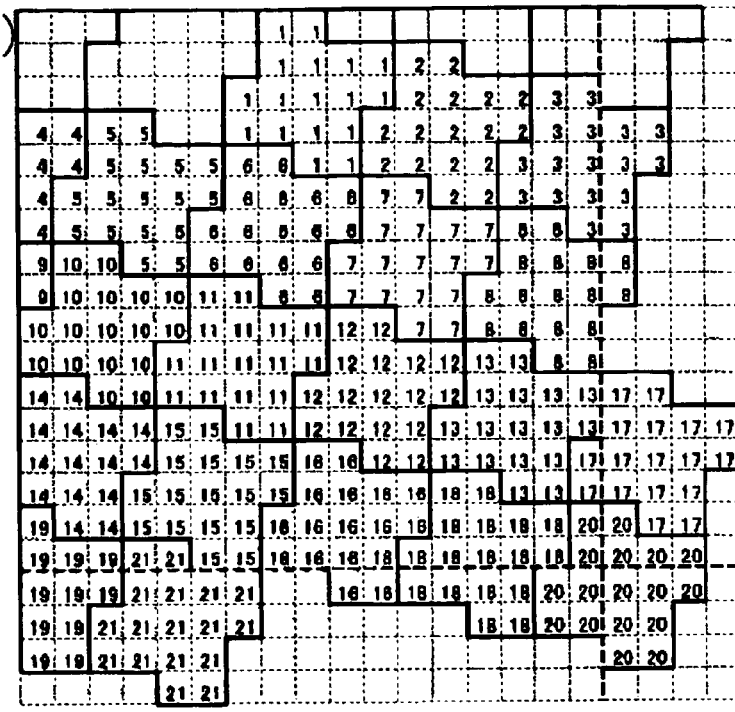
FIG. 12(A) LEFT EDGE CELL BLOCK (-18 DEGREES)
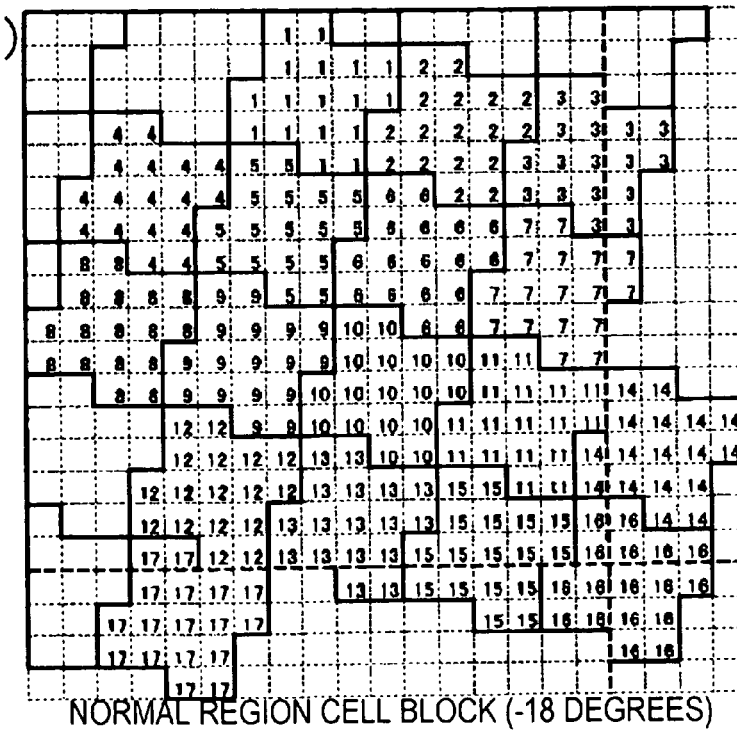
FIG. 12(B) NORMAL REGION CELL BLOCK (-18 DEGREES)

FIG. 14(A)

UPPER LEFT EDGE CELL BLOCK (+18 DEGREES) — 251B

FIG. 14(B)

UPPER CELL BLOCK (+18 DEGREES) — 252B

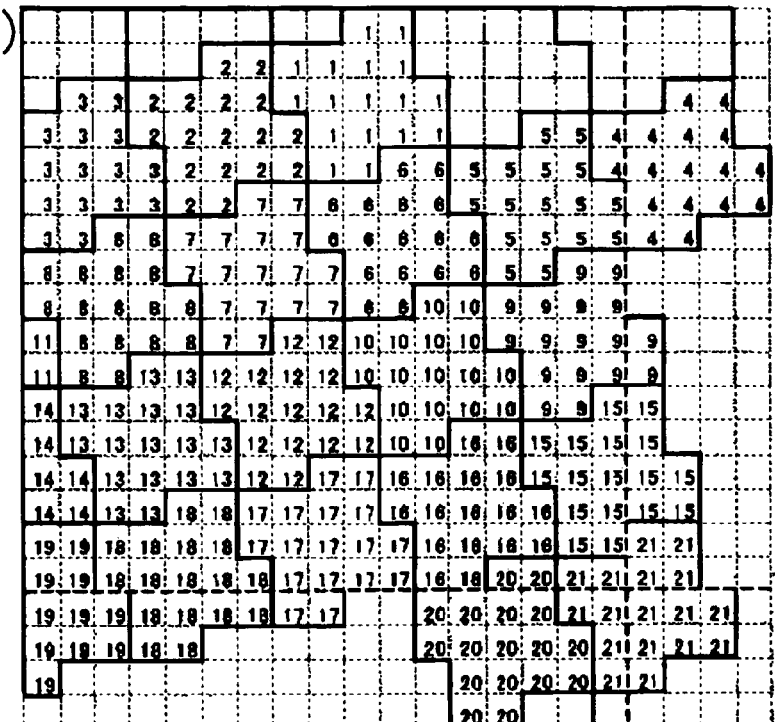
FIG. 15(A) LEFT EDGE CELL BLOCK (+18 DEGREES) —253B
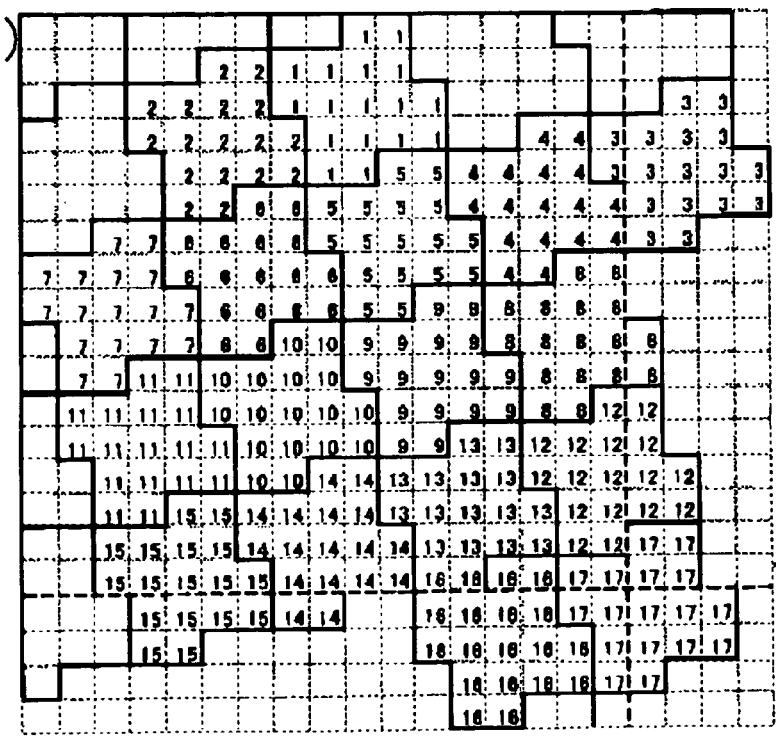
FIG. 15(B) NORMAL REGION CELL BLOCK (+18 DEGREES) —254B

UPPER LEFT EDGE CELL
BLOCK (+45 TIMES)

UPPER EDGE CELL
BLOCK (+45 TIMES)

LEFT EDGE CELL
BLOCK (+45 TIMES)

NORMAL REGION CELL
BLOCK (+45 TIMES)

IMAGE PROCESSING APPARATUS, IMAGE PROCESSING METHOD, IMAGE PROCESSING PROGRAM AND RECORDING MEDIUM FOR RECORDING PROGRAM

CROSS-REFERENCE TO RELATED APPLICATIONS

This application is based upon and claims the benefit of priority from the prior Japanese Patent Application No. 2004-302468, filed on Oct. 18, 2004, the entire contents of which are incorporated herein by reference.

BACKGROUND OF THE INVENTION

1. Field of the Invention

The present invention relates to the halftone processing of grayscale image data by an image processing apparatus such as a laser printer. More specifically, the present invention relates to halftone processing that uses predetermined cells (pixel groups) to find the position of a reference point from the grayscale values of the pixels contained in a cell and generates dots (quantization data) in a proportion corresponding with the sum of the grayscale values of the pixels in the cell in the position of the reference point.

2. Description of the Related Art

Image processing apparatuses such as printers conventionally perform printing on print paper by converting grayscale data with multiple-value grayscale values for each pixel to binary values representing the existence of a dot. Generally, the processing to convert the multiple-value grayscale values to binary values is known as halftone processing.

Such halftone processing includes processing that searches for pixels in a predetermined order until predetermined grayscale values have accumulated and redistributes the accumulated grayscale values in order starting with the pixel with the largest input grayscale values (CAPIX hereinbelow) (Kurosawa, Toshiya and 3 others; "Peripheral brightness accumulation redistribution" (CAPIX method) pseudo intermediate grayscale processor", Institute of Image Electronics Engineers of Japan, 17th Volume, Fifth Issue (1988), for example).

Furthermore, pixel groups ('cells' hereinbelow) consisting of a plurality of pixels are constituted by selecting pixels in a predetermined order until the total of the grayscale values of the pixels reaches a predetermined threshold value, and halftone processing to generate dots in the center position of the cell is also known (Japanese Patent Application Laid Open No. H11-27528, for example).

However, when pixels with a large input grayscale value exist in a scattered configuration in (Kurosawa, Toshiya and 3 others; "Peripheral brightness accumulation redistribution" (CAPIX method) pseudo intermediate grayscale processor", Institute of Image Electronics Engineers of Japan, 17th Volume, Fifth Issue (1988)), the accumulated grayscale values are distributed in accordance with the input grayscale values and the dots also exist in a scattered configuration. When the isolated dots are reproduced by a laser printer, this does not necessarily means that stabile dots can be reproduced. This is because, with regard to the adhesion of toner to the light-sensitive drum, dots of a large size are more stable. Such unstable dots are a cause of image quality deterioration.

Further, Japanese Patent Application Laid Open No. H11-27528 constitutes cells by selecting pixels until the total of the grayscale values is "255" and generates dots at the pixels located at the center of the cells. Therefore, because a dot of one pixel is generated, isolated dots are similarly produced and dot reproduction is unstable.

SUMMARY OF THE INVENTION

Therefore, an object of the present invention is to supply an image processing apparatus with a high halftone processing speed that generates stable dots without image quality deterioration by preventing the production of isolated dots as well as an image processing method, an image processing program, and a recording medium for recording the program.

In order to resolve the above problem, the image processing apparatus of the present invention is an image processing apparatus that converts input image data to output image data having two or more types of quantization data and outputs the output image data, comprising a pixel group reference point determination unit that divides the input image data into predetermined pixel groups and determines a position of a reference point from grayscale values of respective pixels contained in the pixel groups; a pixel group expansion processing unit that takes grayscale values of the part that is less than a threshold value from unprocessed pixels in the periphery of the pixel group into the pixel group if total of the grayscale values of the respective pixels contained in the pixel group is less than the threshold value based on each of values of the quantization data; and a quantization data supply unit that supplies the quantization data to a pixel on the basis of the position of the reference point determined by the pixel group reference point determination unit.

According to this constitution, if the total of the grayscale values of each of the pixels contained in the pixel group is less than the threshold value based on the respective values of the quantization data, the insufficient grayscale values are collected from unprocessed pixels in the periphery of the pixel group by means of the pixel group expansion processing unit and the quantization data can be supplied to the pixel based on the position of the reference point determined by the pixel group reference point determination unit at the moment the threshold value is reached, whereby an error of the threshold value is not generated by the quantization processing of each pixel group.

In order to resolve the above problem, the pixel processing apparatus of the present invention is an image processing apparatus that converts input image data to output image data having two or more types of quantization data and outputs the output image data, comprising a pixel group reference point determination unit that divides the input image data into predetermined pixel groups and determines a position of a reference point from grayscale values of respective pixels contained in the pixel groups; a pixel group expansion processing unit that takes grayscale values of the part that is less than a threshold value from unprocessed pixels in periphery of the pixel group into the pixel group if total of the grayscale values of the respective pixels contained in the pixel group is less than the threshold value based on each of values of the quantization data; a quantization data supply unit that supplies the quantization data to a pixel on the basis of the position of the reference point determined by the pixel group reference point determination unit; and a pulse width modulation unit that generates a pulse width of the K stages (K is a positive integer) in accordance with the quantization data supplied by the quantization data supply unit.

According to this constitution, if the total of the grayscale values of each of the pixels contained in the pixel group is less than the threshold value based on the respective values of the quantization data, the insufficient grayscale values are collected from unprocessed pixels in the periphery of the pixel group by means of the pixel group expansion processing unit and the quantization data can be supplied to the pixel based on the position of the reference point determined by the pixel group reference point determination unit at the moment the threshold value is reached, whereby an error of the threshold value is not generated by the quantization processing of each pixel group.

Further, the image processing apparatus of the present invention calculates the product of the pixel positions of each of the pixels and the grayscale values of each of the pixels relative to all the pixels contained in the pixel group and determines a value in that a total of the product is divided in the total value of the grayscale values of the respective pixels contained in the pixel group as the position of the reference point.

According to this constitution, the pixel group reference point determination unit determines the reference point on the basis of the pixel position of each pixel contained in the pixel group and the grayscale value. Therefore, because the quantization data can be supplied to a suitable pixel corresponding to the distribution of the grayscale values in the pixel group by the quantization data supply unit, output image data faithful to the distribution of grayscale values of the input image data are obtained.

Further, in the case of the image processing apparatus of the present invention, the pixel group expansion processing unit takes grayscale values of the unprocessed pixels which is closest position of the reference point determined by the pixel group reference point determination unit into the pixel group.

According to this constitution, the pixel group reference point determination unit determines the reference point on the basis of the pixel position of each pixel contained in the pixel group and the grayscale value. Therefore, if the insufficient grayscale values are collected from unprocessed pixels in the periphery of the pixel group by means of the pixel group expansion processing unit, the grayscale values can be taken to the pixel group from the closest unprocessed pixels from the position of the reference point of the pixel group and output image data faithful to the distribution of grayscale values of the input image data are obtained.

Furthermore, with the image processing apparatus of the present invention, the pixel group reference point determination unit re-determines a position of the reference point on the basis of the pixel positions and grayscale values and of the taken-into unprocessed pixels each time the pixel group expansion processing unit takes the grayscale values of the unprocessed pixels in periphery of the pixel group.

According to this constitution, if the pixel group expansion processing unit takes the insufficient grayscale values into the pixel group from unprocessed pixels in the periphery of the pixel group, the pixel group reference point determination unit re-determines the position of the reference point on the basis of the position of the taken pixels and the grayscale values. Therefore, because the quantization data can be supplied to a suitable pixel corresponding to the distribution of the grayscale values in the pixel group by the quantization data supply unit, output image data faithful to the distribution of grayscale values of the input image data are obtained.

Further, in the case of the image processing apparatus of the present invention, the quantization data supply unit selects preferentially from the closest pixels to the position of the reference point, and supplies the quantization data to the selected pixels.

According to this constitution, the pixel group reference point determination unit determines the reference point on the basis of the grayscale value of each pixel contained in the pixel group. Therefore, because the quantization data can be supplied to suitable pixels corresponding to the distribution of the grayscale values in the pixel group by the quantization data supply unit, output image data faithful to the distribution of grayscale values of the input image data are obtained.

Further, in the case of the image processing apparatus of the present invention the quantization data supply unit supplies a remainder value to the closest pixel from the position of the reference point which is a pixel other than the pixels to which the quantization data is supplied, if the quantization data supply unit supplies the quantization data to the pixel closest to the position of the reference point, in cases where there is the remainder value by subtracting the supplied quantization data from the total value of the grayscale values of the respective pixels contained in the pixel group.

According to this constitution, if the quantization data supply unit supplies quantization data to the pixel closest to the position of the reference point, in cases where there is a remainder value by subtracting the supplied quantization data from the total value of the grayscale values of the respective pixels contained in the pixel group, the quantization data supply unit supplies the remainder value to the closest pixel from the position of the reference point which is a pixel other than the pixels to which the quantization data is supplied. Therefore, even if the total of the grayscale values of the pixels in the pixel group is equal to or more than the threshold value, the quantization data can be supplied to a plurality of suitable pixels according to the distribution of grayscale values in the pixel group and, therefore, output image data faithful to the distribution of the grayscale values of the input image data are obtained.

Further, in the case of the image processing apparatus of the present invention, the pixel group expansion processing unit takes grayscale values of the part that is less than the threshold value from unprocessed pixels in periphery of the pixel group into the pixel group, if the grayscale value of the pixel to which the remainder value is supplied by the quantization data supply unit is less than the threshold value According to this constitution, if the quantization data supply unit supplies quantization data to the pixel closest to the position of the reference point, in cases where there is a remainder value by subtracting the supplied quantization data from the total value of the grayscale values of the respective pixels contained in the pixel group, it is possible to output quantization data of the closest threshold value in accordance with the remainder value when the remainder value is supplied to the closest pixel from the position of the reference point, which is a pixel other than the pixels to which the quantization data is supplied, whereby output image data faithful to the distribution of the grayscale values of the input image data is obtained.

Further, in order to resolve this problem, the image processing apparatus of the present invention is essentially an image processing apparatus that converts input image data of a plurality of colors to output image data having two or more types of quantization data, comprising a pixel group reference point determination unit that divides the input image data into predetermined pixel groups and determines a position of a reference point from grayscale values of respective pixels contained in the pixel groups; a pixel group expansion processing unit that takes grayscale values of the part that is less than a threshold value from unprocessed pixels in periphery of the pixel group to the pixel group, if total of the grayscale values of the respective pixels contained in the pixel group is less than the threshold value based on each of values of the quantization data; and a quantization data supply unit that supplies the quantization data to a pixel on the basis of the position of the reference point determined by the pixel group reference point determination unit, wherein the difference of angle forming arrangement direction of the pixel group between any two colors among the plurality of colors is substantially 30°.

According to this constitution, because the inclination of the pixel group is substantially 30° between two optional colors, output image data for which Moire fringes are minimum can be obtained.

In order to resolve the above problem, the image processing method of the present invention is essentially an image processing method that converts input image data to output image data having two or more types of quantization data and outputs the output image data, comprising a pixel group reference point determination step of dividing the input image data into predetermined pixel groups and determining a position of a reference point from grayscale values of respective pixels contained in the pixel groups; a pixel group expansion processing step of taking grayscale values of the part that is less than a threshold value from unprocessed pixels in periphery of the pixel group into the pixel group, if total of the grayscale values of the respective pixels contained in the pixel group is less than the threshold value based on each of values of the quantization data; and a quantization data supply step of supplying the quantization data to a pixel on the basis of the position of the reference point determined by the pixel group reference point determination step.

With this constitution, the same effects as those of the image processing apparatus of the present invention are obtained.

Further, in order to resolve the above problem, the image processing program of the present invention is essentially an image processing program that converts input image data to output image data having two or more types of quantization data and outputs the output image data and which permits a computer to execute a pixel group reference point determination step of dividing the input image data into predetermined pixel groups and determining a position of a reference point from the grayscale values of respective pixels contained in the pixel groups; a pixel group expansion processing step of taking grayscale values of the part that is less than a threshold value from unprocessed pixels in periphery of the pixel group to the pixel group, if total of the grayscale values of the respective pixels contained in the pixel group is less than the threshold value based on each of values of the quantization data; and a quantization data supply step of supplying the quantization data to a pixel on the basis of the position of the reference point determined by the pixel group reference point determination step.

With this constitution, the same effects as those of the image processing apparatus of the present invention are obtained.

In addition, the present invention may be a recording medium that can be read by a computer on which the image processing program is recorded A variety of computer-readable media such as a flexible disk, CD-ROM, IC card, or punch card can be used as the recording medium on which the program is recorded.

BRIEF DESCRIPTION OF THE DRAWINGS

FIG. 6 is a flowchart showing dot generation processing;

FIG. 7(A) is a constitutional view showing the movement of the data of the RAM of the halftone processing;

FIG. 7(B) is a constitutional view showing the movement of the data of the RAM of the halftone processing;

FIG. 7(C) is a constitutional view showing the movement of the data of the RAM of the halftone processing;

FIG. 8(A) is a constitutional view showing the movement of the data of the RAM of the halftone processing;

FIG. 8(B) is a constitutional view showing the movement of the data of the RAM of the halftone processing;

FIG. 8(C) is a constitutional view showing the movement of the data of the RAM of the halftone processing;

FIG. 11(A) shows an example of the cell blocks;

FIG. 11(B) shows an example of the cell blocks;

FIG. 12(A) shows an example of the cell blocks;

FIG. 12(B) shows an example of the cell blocks;

FIG. 14(A) shows an example of the cell blocks;

FIG. 14(B) shows an example of the cell blocks;

FIG. 15(A) shows an example of the cell blocks;

FIG. 15(B) shows an example of the cell blocks;

DESCRIPTION OF THE PREFERRED EMBODIMENTS

Embodiments of the present invention will be described with reference to the drawings.

Constitution of the Image Processing Apparatus

First, an outline constitution of the image processing apparatus of an embodiment of the present invention will be described with reference to FIG. 1.

Figure 1:
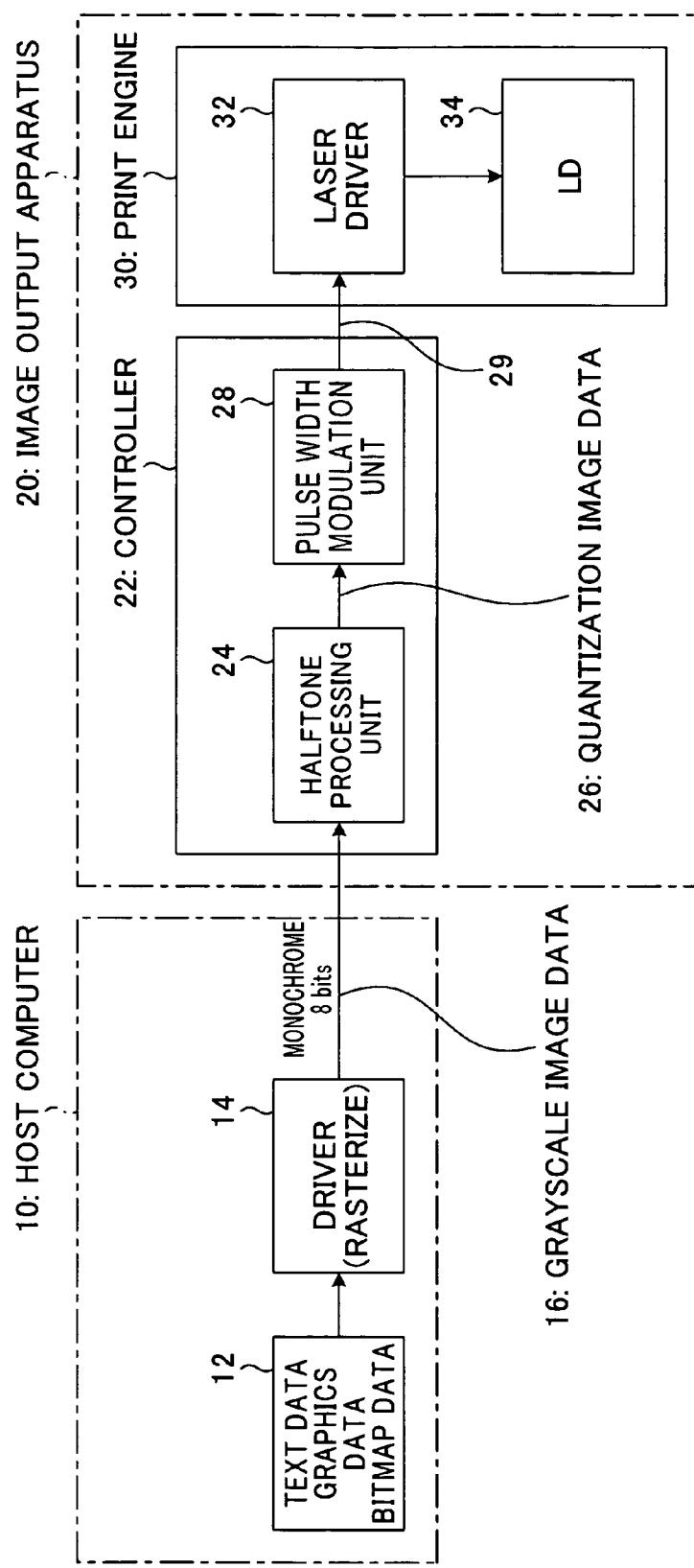
FIG. 1 is a constitutional view of an embodiment in which the image processing apparatus of the present invention is applied to a monochrome input image.

FIG. 1 is a constitutional view of a case where the image processing apparatus of the present invention is applied to a monochrome input image. In this example, grayscale image data 16 (monochrome 8-bit data in FIG. 1) is generated by a host computer 10 and supplied to an image output apparatus 20 such as a page printer. The image output apparatus 20 such as a page printer reproduces a monochrome image based on the grayscale image data 16 thus supplied. The image output apparatus 20 comprises a controller 22 that supplies laser drive data 29 to a print engine 30 by performing image processing and a print engine 30 that regenerates the image in accordance with the laser drive data 29.

The host computer 10 generates text data, graphics data and bitmap data, and so forth, by means of an application program 12 such as a word processor or graphics tool or the like. The respective data that are generated by the application program 12 is rasterized by an image output apparatus driver 14 that is installed on the host computer 10 for conversion to grayscale image data 16 consisting of monochrome data for each pixel. The grayscale image data 16 is an aggregate of grayscale values of 8 bits, that is, of values 0 to 255 for each pixel, for example.

The image output apparatus 20 also comprises a microprocessor (not shown), and the controller 22, which comprises a halftone processing unit 24 and a pulse width modulation unit 28, is constituted by the microprocessor and an installed control program. The halftone processing unit 24 receives grayscale image data 16 and generates quantization image data 26. The constitution of the halftone processing unit 24 will be described subsequently. The quantization image data 26 is supplied to the pulse width modulation unit 28. The pulse width modulation unit 28 generates laser drive data 29 consisting of the existence or absence of a laser drive pulse for each dot.

The laser driver 32 in the print engine 30 drives an image rendition laser diode 34 on the basis of the laser drive data 29. The print engine 30 comprises a light-sensitive drum, transfer belt, and so forth, and the drive unit thereof but these components are omitted in FIG. 1.

The image processing apparatus according to the embodiment of the present invention corresponds to the halftone processing unit 24 that converts the grayscale image data 16 into the quantization image data 26.

Hardware Constitution of the Image Processing Apparatus

A schematic hardware constitution of the image output apparatus 20 to which the present invention is applied will be described next with reference to FIG. 2. Here, the halftone processing unit 24 that constitutes the image output apparatus 20 of FIG. 1 corresponds to the CPU 42, RAM 44, ROM 46, and hard disk 48 in FIG. 2.

Figure 2:
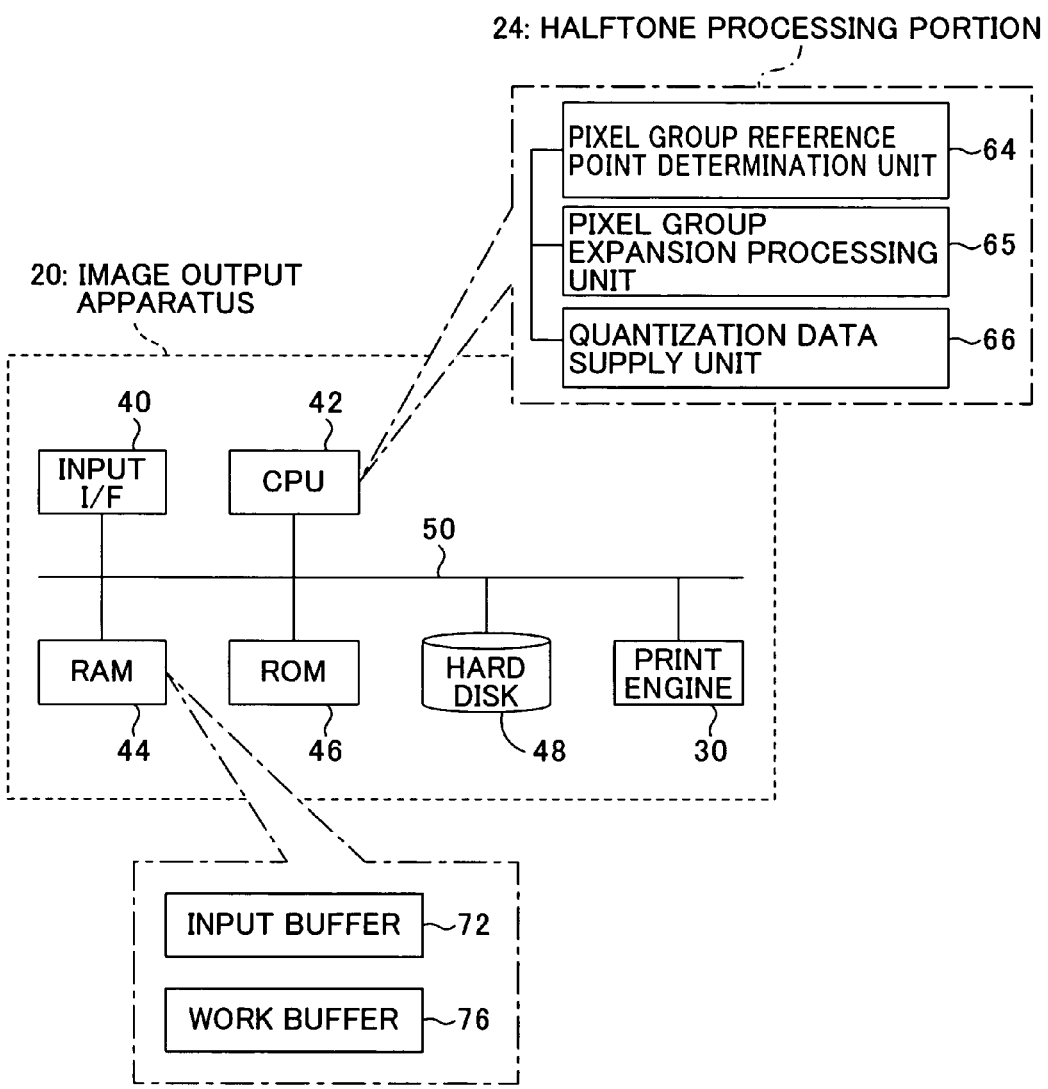
FIG. 2 is a schematic hardware constitution of the image output apparatus 20 to which the present invention is applied.

FIG. 2 is a schematic hardware constitution of the image output apparatus 20 to which the present invention is applied.

The image output apparatus 20 is entirely constituted by an input interface (I/F) 40, CPU 42, RAM 44, ROM 46, hard disk 48, and print engine 30. These components are connected to one another via a bus 50. The input I/F 40 plays the role of an interface with the host computer 10 and image output apparatus 20. Grayscale image data 16 consisting of monochrome data from the host computer 10 that is transmitted by means of a predetermined transmission system is inputted to the input I/F 40 and converted to data that can be processed by the image output apparatus 20. The grayscale image data 16 are stored at once in the RAM 44. Further, the laser drive data 29 is generated and sent to the print engine 30 via the bus 50.

The CPU 42 functions as the image output apparatus 20 by reading a program that is stored in the hard disk 48 or ROM 46 via the bus and executing the program thus read by means of a predetermined operating system, and executes predetermined processing. In particular, where the halftone processing unit 24 is concerned, the CPU 42 executes the respective functions of a pixel group reference point determination unit 64, a pixel group expansion processing unit 65, and a quantization data supply unit 66.

The program for recording such processing may be stored beforehand on the hard disk 48 or ROM 46, or the like, or may be supplied from outside by a computer-readable recording medium such as a CD-ROM, for example, and then held as a result of being stored on the hard disk 48 via a CD-R/RW (not shown). From the beginning, the program may be held on the hard disk 48 as a result of accessing a server or the like for supplying the program and downloading data via network means such as the Internet.

RAM 44 plays the role of a working memory for each of the processes executed under the control of the CPU 42 and holds various data following the processing. The RAM 44 is constituted by an input buffer 72 for archiving the grayscale image data 16 that is outputted by the image output apparatus driver 14 and inputted to the input I/F 40 and a work buffer 76 that is used in the calculation of the reference point and the total of the grayscale values.

Constitution of Cell Block

The details of the halftone processing of the present invention will be described next with reference to the drawings. However, an overview of the present invention will first be described in simple terms with reference to FIGS. 3 and 4. Further, to simplify the description, a case where one pixel group has twelve pixels is described in this embodiment. First, cell blocks 251 to 254, which are blocks of four types of pixel groups, are prepared as shown in FIG. 3. That is, these blocks are the upper left edge cell block 251 shown in FIG. 3A, the upper edge cell block 252 shown in FIG. 3B, the left edge cell block 253 shown in FIG. 3C, and the normal region cell block 254 shown in FIG. 3D.

Cells constituting pluralities of pixel groups (shown with bold lines in FIG. 3) exist in each of the cell blocks 251 to 254. Numbers are assigned in order to the cells and the first (I) to eighth (VIII) cells exist in FIG. 3A, for example. Further, a plurality of input pixels exists in each cell of the cell blocks 251 to 254 and processing to generate a dot constituting quantization data is advanced by finding the position of the reference point in each cell.

Figure 4:
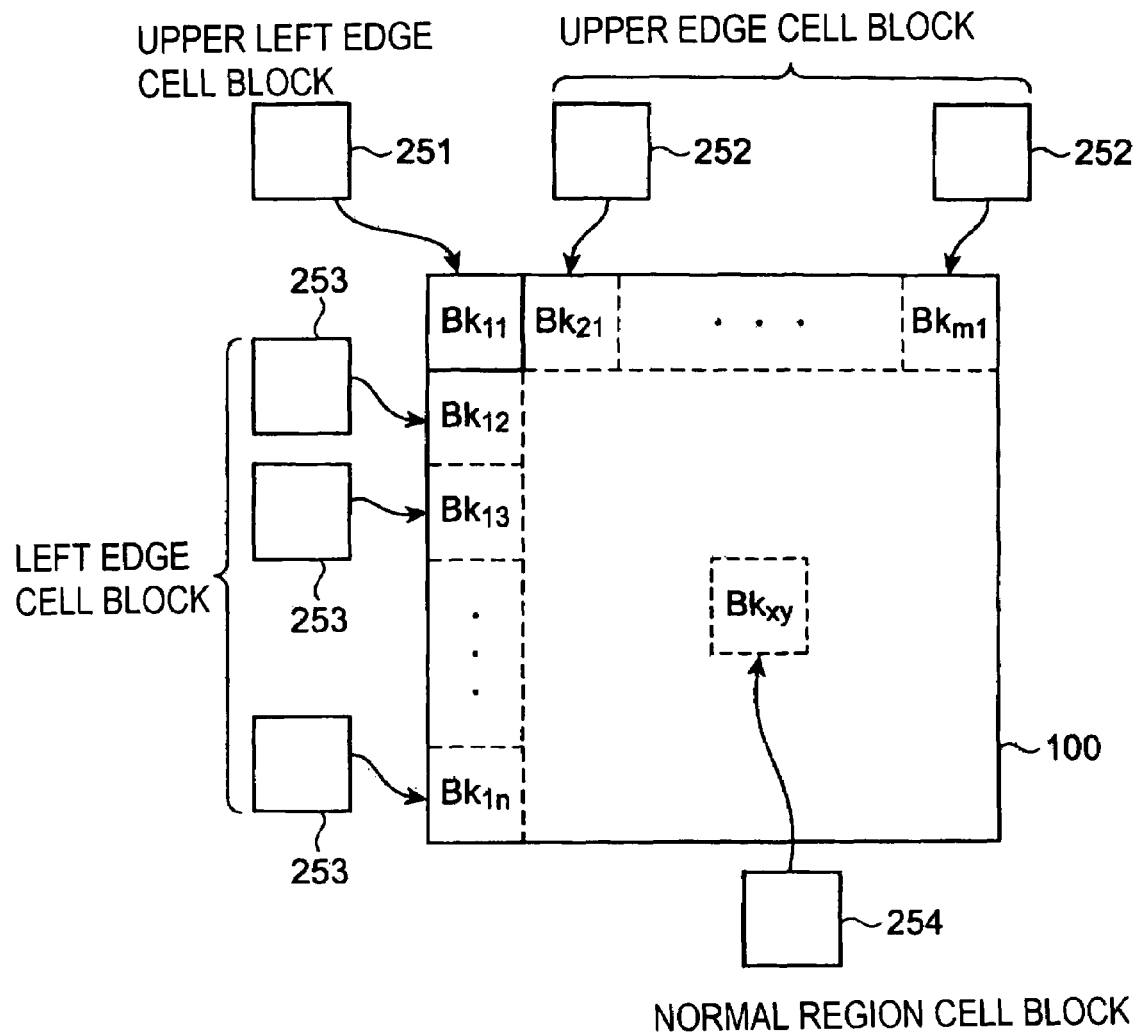
FIG. 4 is a constitutional view serving to illustrate the type of cell block applied to an input image.

These four cell blocks 251 to 254 are applied as shown in FIG. 4 to one page's worth (or one frame's worth) of the input image 100. That is, the upper left edge cell block 251 is applied to the upper left block Bk11 of the input image 100 and the upper edge cell block 252 is applied to the upper blocks Bk21 to Bkm1 (m≧2) of the input image 100. Further, the left edge cell block 253 is applied to the left blocks Bk12 to Bk1n (n≧2) of the input image 100 and the normal region cell block 254 is applied to the blocks Bkxy (2≦x≦m, 2≦y≦n) other than the input image 100.

Here, returning to FIG. 3, the right half of the third (III) cell, which is above the upper left edge cell block 251, is contained in the adjacent right cell block 252 and, therefore, the left side of the first cell, which is above and to the left of the upper edge cell block does not have cell numbers allocated, meaning that processing is not performed in the upper left edge cell block 252. When individual processing is performed for the upper left edge cell block 251 and the upper edge cell block 252 by cutting this third cell into two, dots are struck, which is attributable to the production of isolated dots. Therefore, processing is performed in either one of the cell blocks on the cells straddling the two cell blocks. This processing is produced between each of the cell blocks 251 to 254 on cells located at the lowest point of the upper left edge cell block 251 and cells located at the uppermost point of the left edge cell block 253, and so forth.

These cell blocks 251 to 254 are applied to the input image 100, the position of the reference point corresponding with the input grayscale values in a predetermined cell frame in each of the blocks 251 to 254 is found, and, when a value ("255", for example) indicating dot generation is allocated in accordance with the total of the grayscale values in the cell, this value is allocated to the closest pixel from the position of the reference point.

Because processing is performed to concentrate dots in the position of the reference point in accordance with the total value of the grayscale values of the pixels in the cell in the computation of the position of the reference point, the production of isolated dots is suppressed and dots of a certain magnitude are readily produced. Therefore, stable dots are produced and it is possible to regenerate an image without image quality deterioration.

When a cell is constituted, because predetermined cells are applied in the cell blocks 251 to 254 instead of finding pixels to be loaded into the cell by re-calculating the position of the reference point, there is no processing time for the cell constitution and the processing is proportionately fast.

Although, in the case of conventional halftone dot processing, threshold values and input grayscale values are compared in respective halftone dot cells (threshold value matrix), the occurrence of isolated dot production in which dots occur or do not occur depending on the threshold value may also be considered. However, because dots are generated from the position of the reference dot by collecting grayscale values from the surrounding pixels as per the present invention, stable dots can be reproduced in comparison with halftone dot processing.

Flowchart Showing Processing of Image Processing Apparatus

The processing of the halftone processing unit 24 of the image output apparatus 20 to which the present invention is applied will be described next with reference to FIG. 5.

Figure 5:
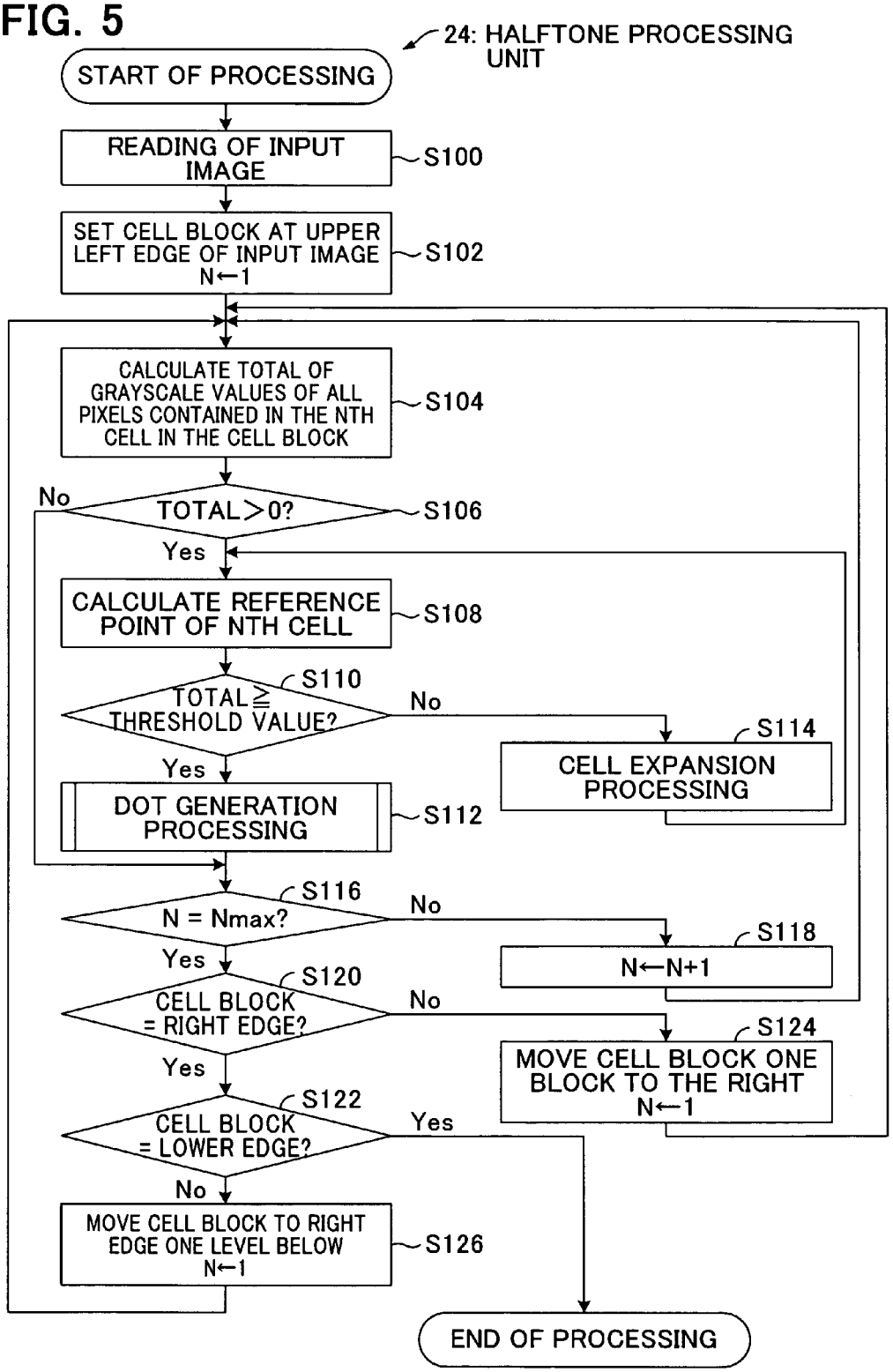
FIG. 5 is a flowchart showing the processing of the halftone processing unit of an image output apparatus.

FIG. 5 is a flowchart showing the processing of the halftone processing unit 24 of the image output apparatus 20 to which the present invention is applied.

When the grayscale image data 16 is inputted to the input I/F 40 by the driver 14 for the image output apparatus, the halftone processing in FIG. 5 is started.

First, in step S100, the grayscale image data 16 is written to the input buffer 72 of the RAM 44.

Figure 3A:
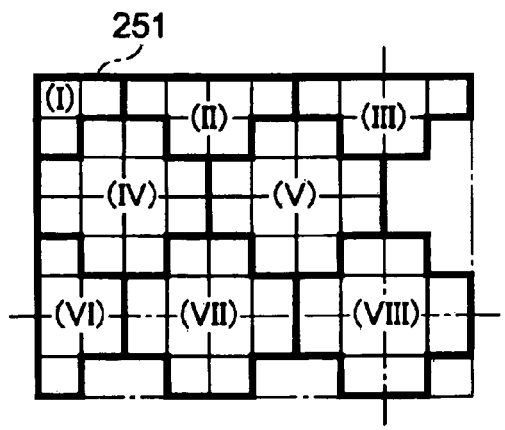
FIG. 3(A) is a constitutional view of the cell blocks.
Figure 3B:
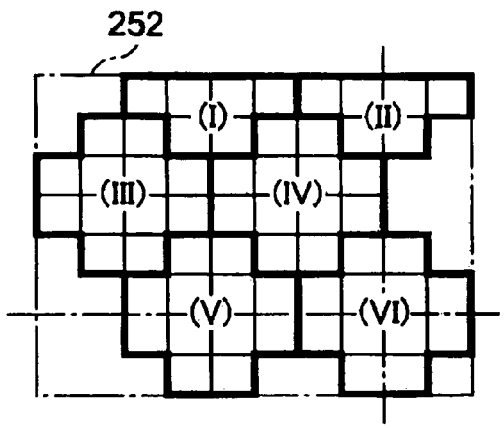
FIG. 3(B) is a constitutional view of the cell blocks.
Figure 3C:
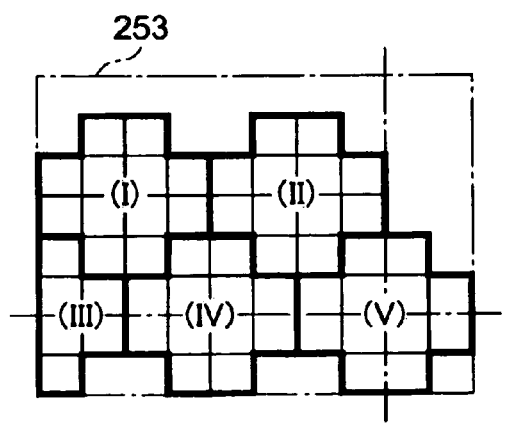
FIG. 3(C) is a constitutional view of the cell blocks.
Figure 3D:
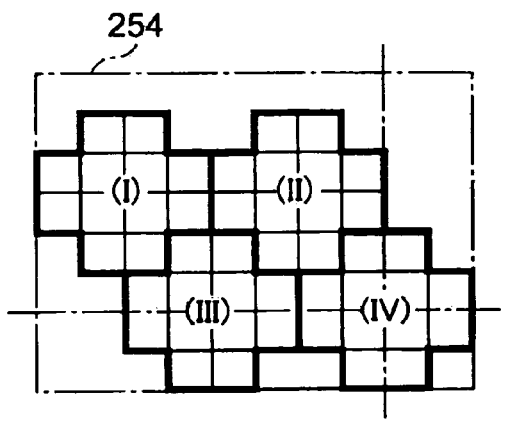
FIG. 3(D) is a constitutional view of the cell blocks.

Next, in step S102, where the initially processed cell blocks are concerned, the upper left edge cell block 251 of Bk11 in FIG. 4 is established as the cell block Bk, and, as initially processed cells, the (N=1)th (I) cell of the upper left edge cell block 251 in FIG. 3A is established as cell C1.

Thereafter, in step S104, the total of the grayscale values of all the pixels contained in the cell C1 in the cell block Bk are calculated and the total of the grayscale values is written to the work buffer 76 of the RAM 44 as Tn.

Thereafter, in step S106, it is judged whether the total Tn of the grayscale values written to the work buffer 76 of the RAM 44 is greater than 0. If the total Tn is larger, the processing proceeds to step S108 and, if the total Tn is not larger, the processing moves to step S116.

Thereafter, in step S108, the coordinates of the reference point are calculated based on the pixels contained in the cell C1, and the coordinates of the reference point are written in the work buffer 76 of the RAM 44 as (Gx, Gy). The coordinates of the reference point are calculated by Equations (1) and (2) below.

$$Gx = \Sigma ((X \text{ coordinate of each pixel}) \times (\text{grayscale value of each pixel}))/Tn \quad (1)$$

$$Gy = \Sigma ((Y \text{ coordinate of each pixel}) \times (\text{grayscale value of each pixel}))/Tn \quad (2)$$

Thereafter, in step S11O, it is judged whether the total Tn of the grayscale values written to the work buffer 76 of the RAM 44 is equal to or more than the threshold value Vth. In cases where the total Tn is equal to or more than the threshold value Vth, the processing moves to step S112 and, in cases where the total Tn is not equal to or more than the threshold value Vth, the processing moves to step S114.

Thereafter, in step S112, dot generation processing (described subsequently) is performed on the basis of the reference dots (Gx, Gy) calculated in step S108.

Meanwhile, in step S114, the increment for which the total Tn of the grayscale values of the cell C1 is less than the threshold value Vth is the unprocessed pixels in the periphery of the cell C1, the closest pixels from the reference point (Gx, Gy) that is calculated in step S108 is selected and the grayscale value (Vth−Tn) is taken as the pixel of the cell C1 from the grayscale values of the pixels, and the total Tn of the grayscale values of the work buffer 76 of the RAM 44 is updated, whereupon the processing moves to step S108.

Thereafter, in step S116, it is judged whether cell C1 is the final cell (cell number is the maximum cell) in the cell block Bk and, in cases where cell C1 is the final cell, the processing moves to step S120 and, in cases where cell C1 is not the final cell, the processing moves to step S118.

Thereafter, in step S120, it is judged whether cell block Bk comes at the right edge of the input image 100 and, if so, the processing moves to step S122 and, if not, the processing moves to step S124.

On the other hand, in step S118, the (N=N+1)th cell is set as the cell C1 and the processing moves to step S104.

Thereafter, instep S122, it is judged whether the cell block Bk comes at the lower edge of the input image 100 and, if so, the halftone processing is terminated and, if not, the processing moves to step S126.

On the other hand, in step S124, the cell block Bk is moved one block to the right and this block is set as the cell block Bk, whereupon the (N=1)th cell of the cell block Bk is set as the cell C1 and the processing moves to step S104.

On the other hand, in step S126, cell block Bk is moved one level below to the left edge and this block is set as the cell block Bk, whereupon the (N=1)th cell of the cell block Bk is set as cell C1 and the processing moves to step S104.

Further, the processing of step S108 corresponds to the pixel group reference point determination unit, pixel group reference point determination process, and pixel group reference point determination step, step S114 corresponds to the pixel group expansion processing unit, the pixel group expansion processing process, and the pixel group expansion processing step, and step S112 corresponds to the quantization data supply unit, quantization data supply process, and the quantization data supply step.

Flowchart Showing Dot Generation Processing

Dot generation processing of step S112 of the halftone processing unit 24 will be described next with reference to FIG. 6.

FIG. 6 is a flowchart showing the dot generation processing of step S112 of the halftone processing unit 24 of the image output apparatus 20 to which the present invention is applied.

First, in step S200, the total Tn of the grayscale values written to the work buffer 76 of the RAM 44 that was calculated in step S104 in step 5 is set as the remaining grayscale value T0=Tn and the remaining grayscale value T0 is written to the work buffer 76 of the RAM 44.

Thereafter, in step S202, a search is made for the dot non-output pixel closest to the reference point (Gx, Gy) written to the work buffer 76 of the RAM 44 that was calculated in step S108 in FIG. 5, which is a pixel in cell C1.

Next, in step S204, it is judged whether there is a dot non-output pixel and, if so, the processing moves to step S206 and, if not, dot generation processing is terminated and the processing moves to step S116 in FIG. 5.

Thereafter, in step S206, it is judged whether the remaining grayscale value T0 is equal to or more than the threshold value Vth and, if the grayscale value T0 is equal to or more than the threshold value Vth, the processing moves to step S208 and, if the grayscale value is not equal to or more than the threshold value Vth, the processing moves to step S214.

Next, in step S208, the threshold value Vth is outputted to the sought dot non-output pixel.

Thereafter, in step S210, the threshold value Vth is subtracted from the remaining grayscale value T0 (T0=T0−Vth) and the remaining grayscale value T0 is written to the work buffer 76 of the RAM 44.

Next, in step S212, it is judged whether the remaining grayscale value T0 is 0 and, if the remaining grayscale value is 0, dot generation processing is terminated and, if the remaining grayscale value is not 0, the processing moves to step S202.

On the other hand, in step S214, the remaining grayscale value T0 is outputted to the sought dot non-output pixel and dot generation processing is terminated.

Operation of Halftone Processing

Next, with reference to FIGS. 7 and 8, the movement of the data of the RAM 44 of the halftone processing unit 24 of the image output apparatus 20 to which the present invention is applied will be described.

FIGS. 7 and 8 are constitutional views showing the movement of the data of the RAM 44 of the halftone processing unit 24 of the image output apparatus 20 to which the present invention is applied. In the description of this embodiment, the threshold value Vth=255.

Halftone Processing Operation (Case of In-Cell Insufficiency)

FIG. 7 is a constitutional view showing the movement of data of the RAM 44 of the halftone processing unit 24 of the image output apparatus 20 in a case where the total Tn of the grayscale values of all the pixels contained in the cell C1 ((N−1)th cell) is less than the threshold value Vth.

First, FIG. 7A shows part of the upper left edge cell block ((column 0, row 0) to (column 5, row 5)) in FIG. 3A, which constitutes a state (S100 in FIG. 5) where the grayscale image data 16 is written to the input buffer 72 of the RAM 44. For example, the (N=1)th cell C1 has the pixels ((column 0, row 0), (column 1, row 0), (column 0, row 1), and 80 is written as the respective grayscale values of these pixels.

Bk11 in FIG. 4 is set as the cell block Bk and the (N−1)th cell of cell block Bk is set as the cell C1 (S102 in FIG. 5).

The total Tn=80+80+80=240 of the grayscale values of all the pixels contained in cell C1 is written to the work buffer 76 of the RAM 44 (S104 in FIG. 5) and, because the total Tn of the grayscale values>0 (S106 in FIG. 5), the reference point (Gx, Gy) is calculated as follows by means of Equations (1) and (2) on the basis of the pixels contained in the cell C1 (S108 in FIG. 5).

$$Gx=(80\times0+80\times1+80\times0)/240=0.33$$

$$Gy=(80\times0+80\times0+80\times1)/240=0.33$$

Because the total Tn of the grayscale values written to the work buffer of the RAM 44=240<255 (S110 in FIG. 5), the pixel closest to the reference point (0.33, 0.33), which are unprocessed pixels in the periphery of the cell C1, is selected, and Vth−Tn=15 is taken based on the grayscale value of this pixel as the pixel of the cell C1 (S114 in FIG. 5). As shown in the input buffer 72 of FIG. 7B, the unprocessed pixel closest from the reference point (0.33, 0.33) is the pixel (column 1, row 1), Vth−Tn=15 is subtracted from the grayscale value of the pixel and introduced to cell C1. The input buffer 72 in FIG. 7C is in a state where Vth−Tn=15 has been introduced to cell C1 from the pixel (row 1, column 1). The total Tn of the grayscale values=240+15=255. Further, 5 grayscale values remain for pixel (row 1, column 1).

The reference point (Gx, Gy) following the introduction of Vth−Tn=15 to cell C1 from pixel (row 1, column 1) is calculated as follows (S108 in FIG. 5).

$$Gx=(80\times0+80\times1+80\times0+15\times1)/255=0.37$$

$$Gy=(80\times0+80\times0+80\times1+15\times1)/255=0.37$$

Because the total Tn of the grayscale values=the threshold value Vth (S110 in FIG. 5), dot generation processing is performed (S112 in FIG. 5).

The remaining grayscale value T0=Tn=255 is established and the remaining grayscale value T0 is written to the work buffer 76 of the RAM 44 (S200 in FIG. 6).

A search is made for a pixel (column 0, row 0) constituting a dot non-output pixel closest to the reference point (0.37, 0.37) (S202, S204 in FIG. 6) and, because the remaining grayscale value T0=255=threshold value Vth (S206 in FIG. 6), the threshold value Vth=255 is outputted to the sought pixel (column 0, row 0) (S208 in FIG. 6).

Because the remaining grayscale value T0−Vth=255−255=0 (S210 and S212 in FIG. 6), dot generation processing is terminated. FIG. 7C shows a state where dot 255 is generated in pixel (column 0, row 0) in the (N=1)th cell.

Cell C1 is the (N=1)th cell (S116 in FIG. 5) and the (N=N+1=2)th cell is set as cell C1 (S118 in FIG. 5), and the processing is repeated for the (N=2)th cell.

Halftone Processing Operation (Case of In-Cell Excess)

FIG. 8 is a constitutional view showing the movement of data of the RAM 44 of the halftone processing unit 24 of the image output apparatus 20 in a case where the total Tn of the grayscale values of all the pixels contained in the cell C1 ((N=4)th cell) is equal to or more than the threshold value Vth.

First, FIG. 8A represents a state where the processing of the halftone processing unit 24 in FIG. 5 (S100 to S116 in FIG. 5) as far as the (N=3)th cell (III) is performed on the data in FIG. 7A rendered by writing the grayscale image data 16 to the input buffer 72 of the RAM 44 and in which the (N=4)th cell (IV) is set as cell C1 in step S118 in FIG. 5.

The total Tn=525 of the grayscale values of all the pixels contained in the cell C1 is written to the work buffer 76 of the RAM 44 (S104 in FIG. 5) and, because the grayscale value total Tn>0 (S106 in FIG. 5), the reference point (Gx, Gy) is calculated as follows in Equations (1) and (2) on the basis of the pixels contained in cell C1 (S108 in FIG. 5).

$$Gx=1.91$$

$$Gy=2.94$$

Because the total Tn of the grayscale values written to the work buffer 76 of the RAM 44=525>255 (S110 in FIG. 5), dot generation processing is performed (S112 in FIG. 5).

The remaining grayscale value T0=Tn=525 is set and the remaining grayscale value T0 is written to the work buffer 76 of the RAM 44 (step S200 in FIG. 6).

A search is made for the pixel (column 2, row 3), which is the dot non-output pixel closest to the reference point (1.91, 2.94) (S202, S204 in FIG. 6) and, because the remaining grayscale value T0=525>threshold value Vth (S206 in FIG. 6), the threshold value Vth=255 is outputted to the sought pixel (column 0, row 0) (S208 in FIG. 6).

Because the remaining grayscale value T0−Vth=525−255=270 (S210, S212 in FIG. 6), a search is made once again for the pixel (column 2, row 2), which is the dot non-output pixel closest to the reference point (1.91, 2.94) (S202, S204 in FIG. 6) and, because the remaining grayscale value T0=270>threshold value Vth (S206 in FIG. 6), the threshold value Vth=255 is outputted to the sought pixel (column 2, row 2) (S208 in FIG. 6).

Because the remaining grayscale value T0−Vth=270−255=15(S210, S212 in FIG. 6), a search is made once again for the pixel (column 1, row 3), which is the dot non-output pixel closest to the reference point (1.91, 2.94) (S202, S204 in FIG. 6) and, because the remaining grayscale value T0=15<threshold value Vth (S206 in FIG. 6), the remaining grayscale values T0=15 is outputted to the sought pixel (column 1, row 3) (S214 in FIG. 6) and the dot generation processing ends. FIG. 8C shows a state in which dot 255 is generated in pixel (column 2, row 2), dot 255 is generated in pixel (column 2, row 3), and dot 15 is generated in pixel (column 1, row 3) in the (N=4)th cell.

Because cell C1 is the (N=4)th cell (S116 in FIG. 5), (N=N+1=5)th cell is set as cell C1 (S118 in FIG. 5), and processing is repeated for the (N=5)th cell.

Operation of Halftone Processing (Less than Pulse Width)

Processing of the image output apparatus 20 that comprises the pulse width modulation unit 28 that generates the pulse width of K stages (K is a positive integer) with respect to dots that are supplied in the dot generation processing (quantization data supply unit) of step S112 in FIG. 5 will be described next. In this embodiment, a case where the pulse width of K=8 stages is generated for grayscale image data 16 of 256 grayscales is described. When the 256 grayscales are divided in eight stages, the pulse width is 32. Therefore, dots with values 0, 32, 64, 96, 128, 160, 192, 224, and 255 can be generated.

Figure 9:
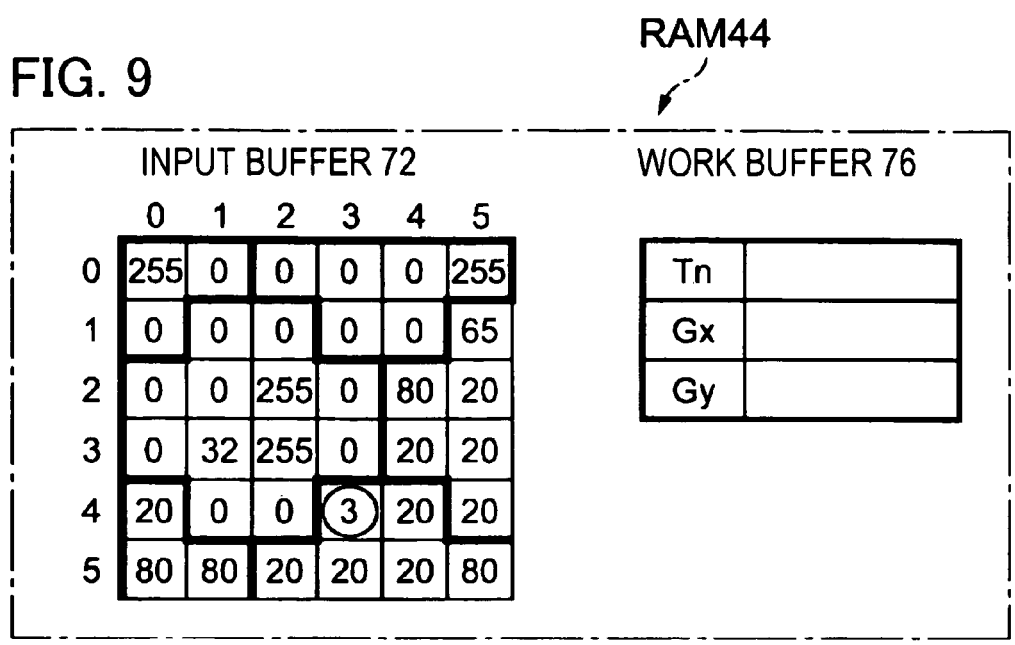
FIG. 9 is a constitutional view showing the movement of the data of the RAM of the halftone processing.

In FIG. 8C, dots of 15 values are generated for pixel (column 1, row 3), but 17 of the dots of the 32 values of the narrowest pulse width are lacking. This lacking component is unprocessed pixels in the periphery of the (N=4)th cell and, therefore, the pixel closest to the reference point (1.91, 2.94) is selected, and the lacking component from the grayscale values of the pixels is introduced to pixel (column 1, row 3). The unprocessed pixel closest to the reference point (1.91, 2.94) is pixel (column 3, row 4), the lacking component 17 is captured from value 20 of this pixel and introduced to pixel (column 1, row 3). As a result, as shown in FIG. 9, pixel (column 1, row 3) has 32 values and pixel (column 3, row 4) has the remaining 3 values and is taken as the unprocessed pixel.

Second Embodiment

Figure 10:
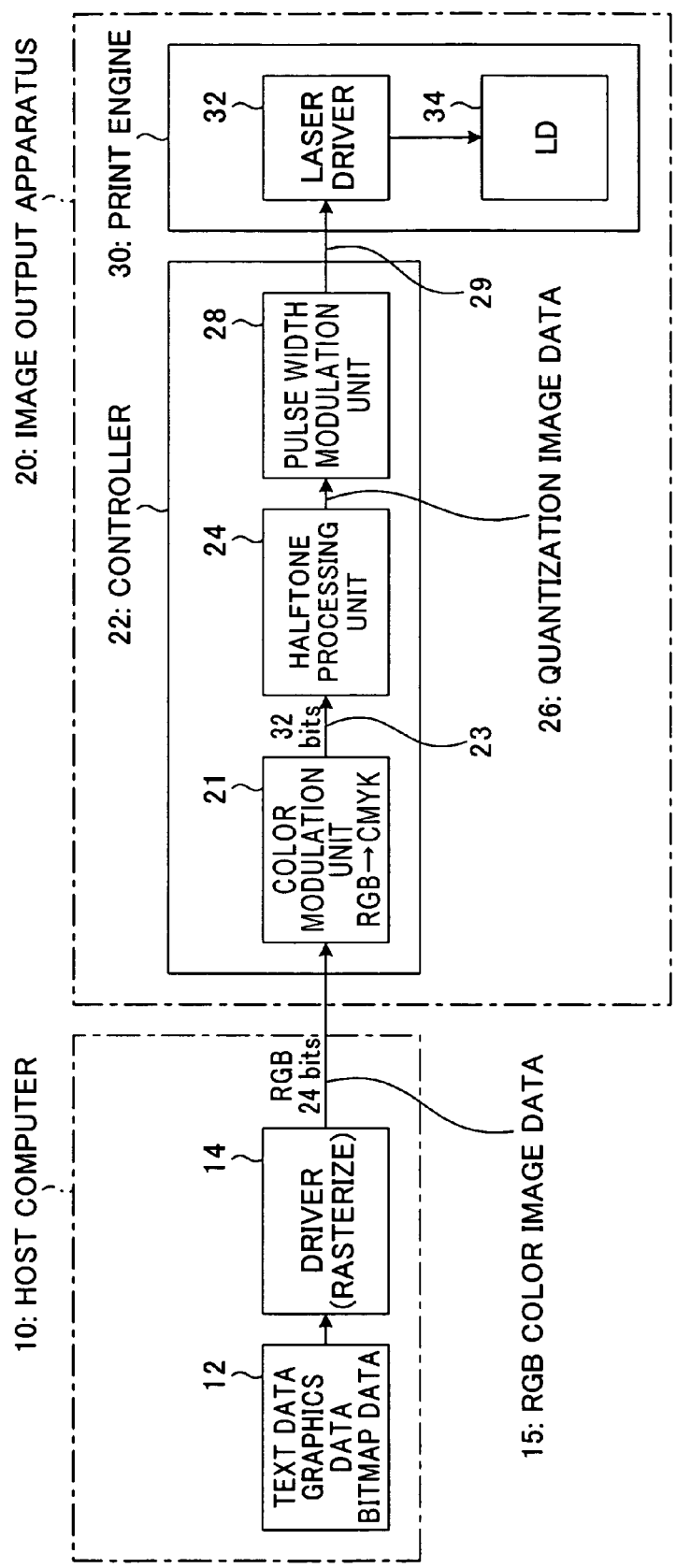
FIG. 10 is a constitutional view of an embodiment in which the image processing apparatus of the present invention is applied to a color input image.

Further, thus far, an embodiment of the present invention was described with the premise that image processing apparatus of the present invention is applied to a monochrome input image. However, the image processing apparatus of the present invention can also be applied to a color input image. FIG. 10 is a constitutional view in which the image processing apparatus of the present invention is applied to a color input image.

In this example, RGB color image data 15 is generated by the host computer 10 and supplied to an image output apparatus 20 such as a page printer. The image output apparatus 20 such as a page printer reproduces a color image on the basis of the RGB color image data 15 thus supplied. The image output apparatus 20 comprises a controller 22 for supplying laser drive data 29 to the print engine 30 by performing image processing and a print engine 30 that regenerates an image in accordance with the laser drive data 29.

The host computer 10 generates text data, graphics data and bitmap data and so forth by means of an application program 12 such as a word processor or graphics tool or the like. The respective data that are generated by the application program 12 is rasterized by an image output apparatus driver 14 that is installed on the host computer 10 for conversion to RGB color image data 15 consisting of RGB data for each dot or pixel. The RGB color image data 15 is an aggregate of RGB data that show each color (RED, GREEN, and BLUE) of the respective pixels by means of 8 bits, that is, values 0 to 255, for example.

The image output apparatus 20 also comprises a microprocessor (not shown), and the controller 22, which comprises a color conversion unit 21, a halftone processing unit 24 and a pulse width modulation unit 28, is constituted by the microprocessor and an installed control program.

The color conversion unit 21 receives RGB color image data 15 and generates grayscale image data 23 with a total of 8×4=32bits in which the four colors C (cyan), M (magenta), Y (yellow), and K (black) are each represented by means of 8 bits. The grayscale image data 23 is similar to that shown in FIG. 7 or the like, for example. However, in place of the concentration of black for each pixel, the concentration of color of any one of C (cyan), M (magenta), Y (yellow), and K (black) is recorded for each pixel.

The halftone processing unit 24 receives the grayscale image data 23 and generates quantization image data 26. The constitution of the halftone processing unit 24 is as described earlier. The quantization image data 26 is supplied to the pulse width modulation unit 28. The pulse width modulation unit 28 generates laser drive data 29 indicating the presence or absence of a laser drive pulse for each dot.

The laser driver 32 in the print engine 30 drives laser diodes 34 for image rendition on the basis of the laser drive data 29. The print engine 30 comprises a light-sensitive drum, transfer belt and drive unit thereof. Although print engine 30 comprises a light-sensitive drum, transfer belt and drive unit thereof, these components are omitted from FIG. 10.

Further, the halftone processing unit 24 may be constituted as a result of a halftone processing program being executed by the image output apparatus 20. The halftone processing program is usually in a form that is readable by the image output apparatus 20 and is recorded and distributed on a recording medium such as a flexible disk, CD-ROM. The program is read by a media reading apparatus (a CD-ROM drive, a flexible disk drive or the like) and then installed on a hard disk. Further, the program is constituted to execute desired processing as a result of the CPU suitably reading the desired program from a hard disk. Alternatively, the image output apparatus 20 comprises a recording medium such as a ROM. The halftone processing program may be recorded on this ROM.

Difference in Cell Inclination Substantially 30°

A case where, in the input image data of a plurality of colors, the difference in cell inclination between two optional colors of a plurality of colors is substantially 30° will be described simply next with reference to FIGS. 11 to 18. First, as shown in FIGS. 11 and 12, four types of cell blocks 251A to 254A are prepared for grayscale data with a certain color component among CMYK. That is, these cell blocks are the upper left edge cell block 251A shown in FIG. 11A, the upper edge cell block 252A shown in FIG. 11B, the left edge cell block 253A shown in FIG. 12A and the normal region cell block 254A shown in FIG. 12B.

A plurality of pixel groups (displayed herein below as 'cells' with bold lines in the drawings) exists in each of the cell blocks 251A to 254A. Further, a plurality of input pixels exists in the respective cells of cell blocks 251A to 254A and processing for dot generation is advanced by finding the position of a reference point in each cell. The numerals in the respective cells indicate the order of advancement of the processing in the cell block. In the drawings, the rightward direction is the main scanning direction and the downward direction is the supplementary scanning direction.

These four cell blocks 251A to 254A are applied as shown in FIG. 4 to one page's worth (or one frame's worth) of the input image 100. That is, the upper left edge cell block 251A is applied to the upper left edge cell block Bk11 of the input image 100 and the upper edge cell block 252A is applied to the upper edge cell blocks Bk21 to Bkm1 ($m \geq 2$) of the input image 100. Further, the left edge cell block 253A is applied to the left edge cell blocks Bk12 to Bk1n ($n \geq 2$) of the input image 100, and the normal region cell block 254A is applied to the remaining cell blocks Bkxy ($2 \leq x \leq m$, $2 \leq y \leq n$) of the input image 100.

Further, the position of the reference point in each cell in the respective cell blocks 251A to 254A is calculated and an output grayscale value indicating halftone dot (or dot) generation is allocated to the pixel existing in the position of the reference point. Because there is a concentration of the input grayscale values in each cell at the pixel in the position of the reference point, stable dots of a certain size are produced. Further, because individual cell frames are predetermined, calculations for the constitution of cells need not be performed each time and, therefore, the speed of processing can be increased.

Figure 13:
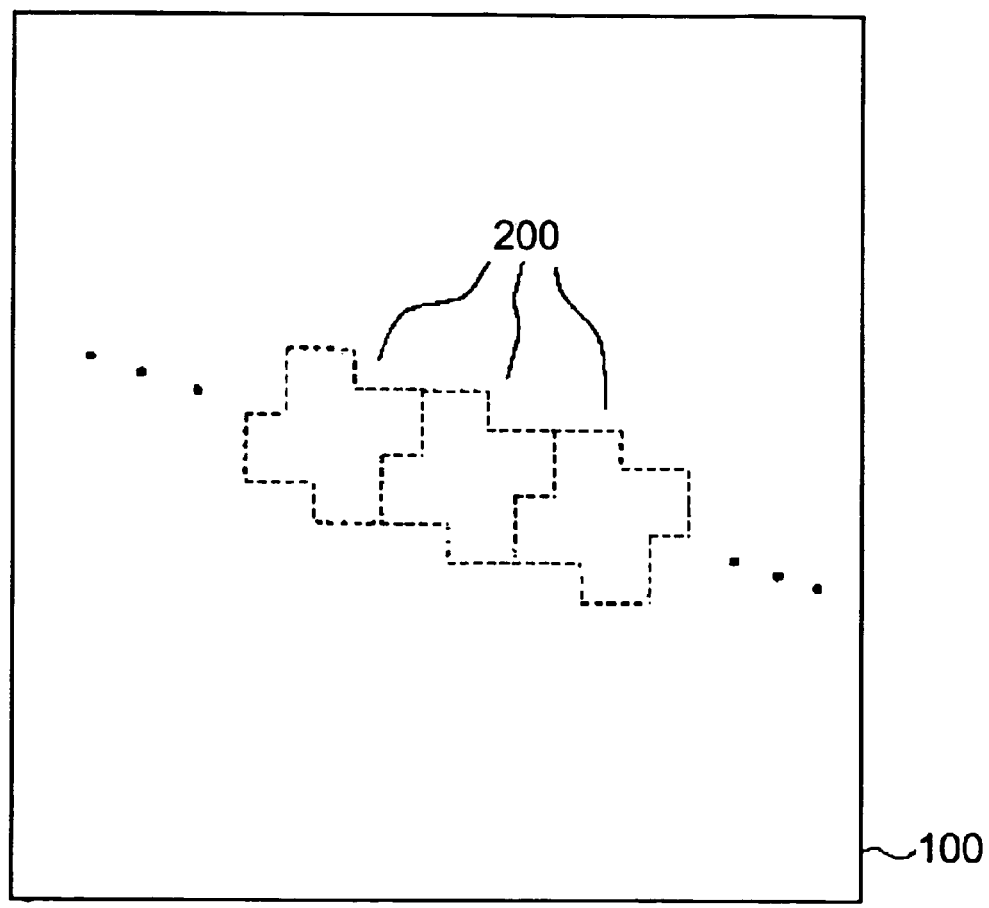
FIG. 13 serves to illustrate cells applied to an input image.
Figure 16:
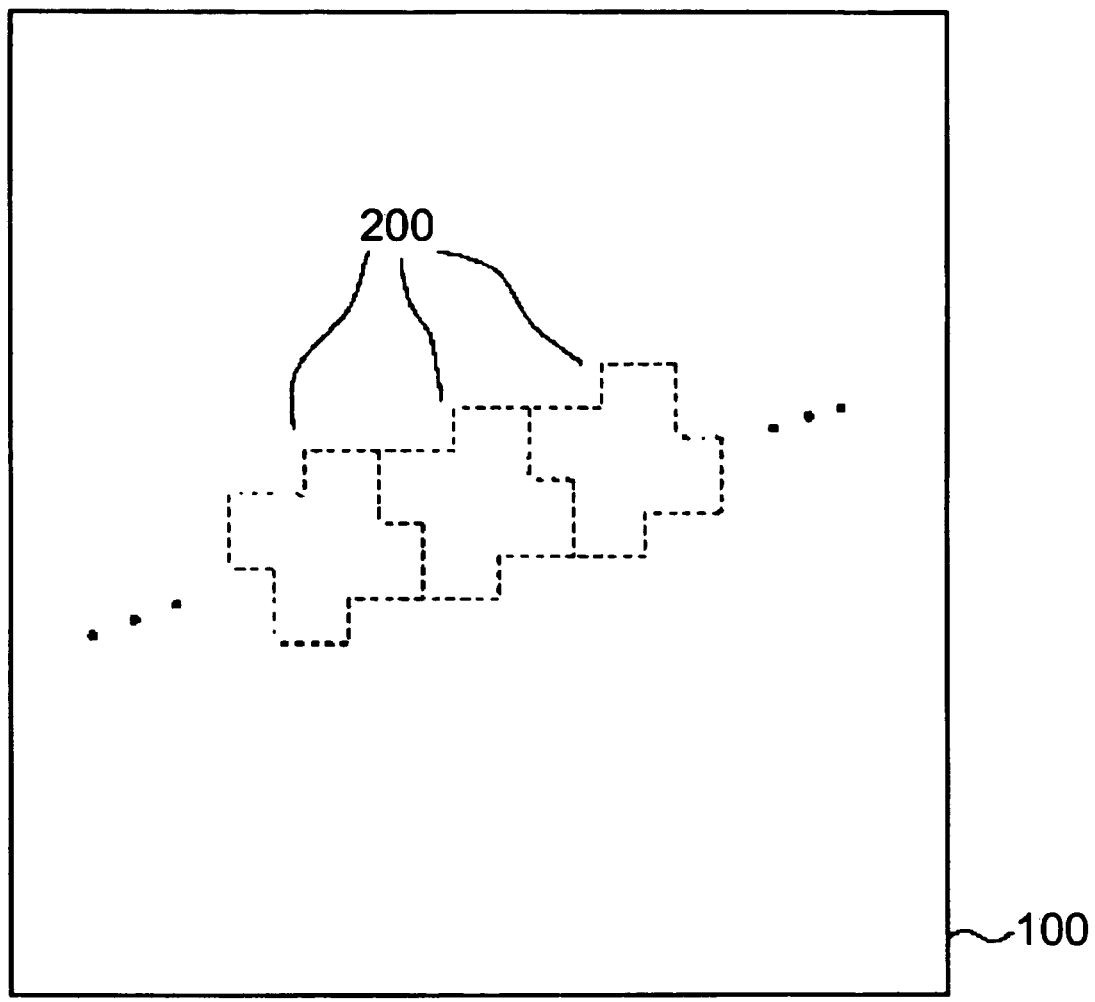
FIG. 16 serves to illustrate cells that are applied to an input image.
Figure 17A:
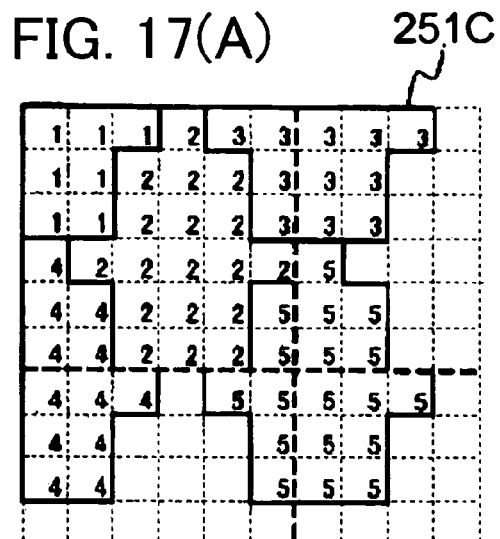
FIG. 17(A) shows an example of the cell blocks.
Figure 17B:
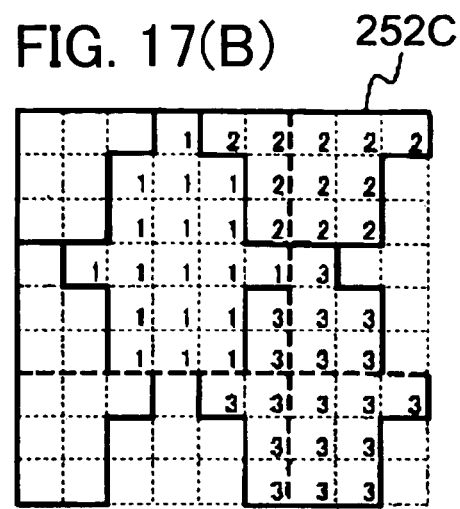
FIG. 17(B) shows an example of the cell blocks.
Figure 17C:
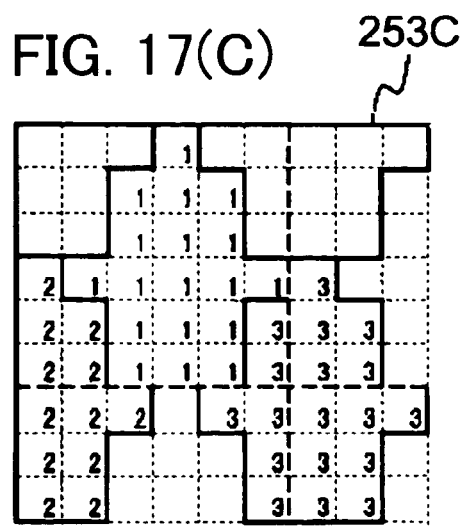
FIG. 17(C) shows an example of the cell blocks.
Figure 17D:
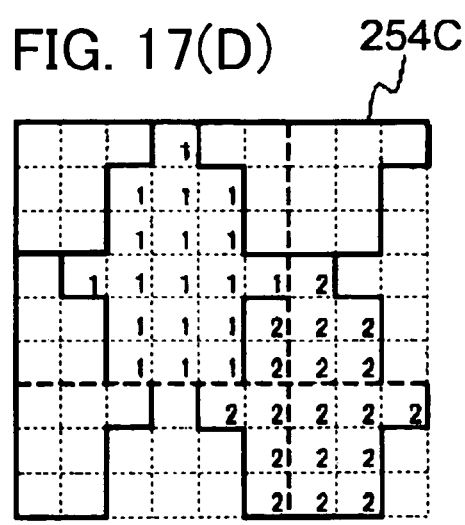
FIG. 17(D) shows an example of the cell blocks.

Therefore, when each cell is considered, supposing that the main scanning direction is 0° as shown in FIG. 13, cell 200 is applied at an inclination of substantially −18°. Further, of CMYK, cell blocks 251B to 254B shown in FIGS. 14 and 15 are applied to planes of additional colors. In this case also, cell blocks of four types, namely, the upper left edge cell block 251B (see FIG. 14A), the upper edge cell block 252B (see FIG. 14B), the left edge cell block 253B (see FIG. 15A), and the normal region cell block 254B (see FIG. 15B) are applied to the input image 100. Further, an output grayscale value indicating dot generation is allocated to the pixel closest to the position of the reference point in each cell. In this case, as shown in FIG. 16, each cell 200 is at an inclination of substantially −18°.

Figure 18:
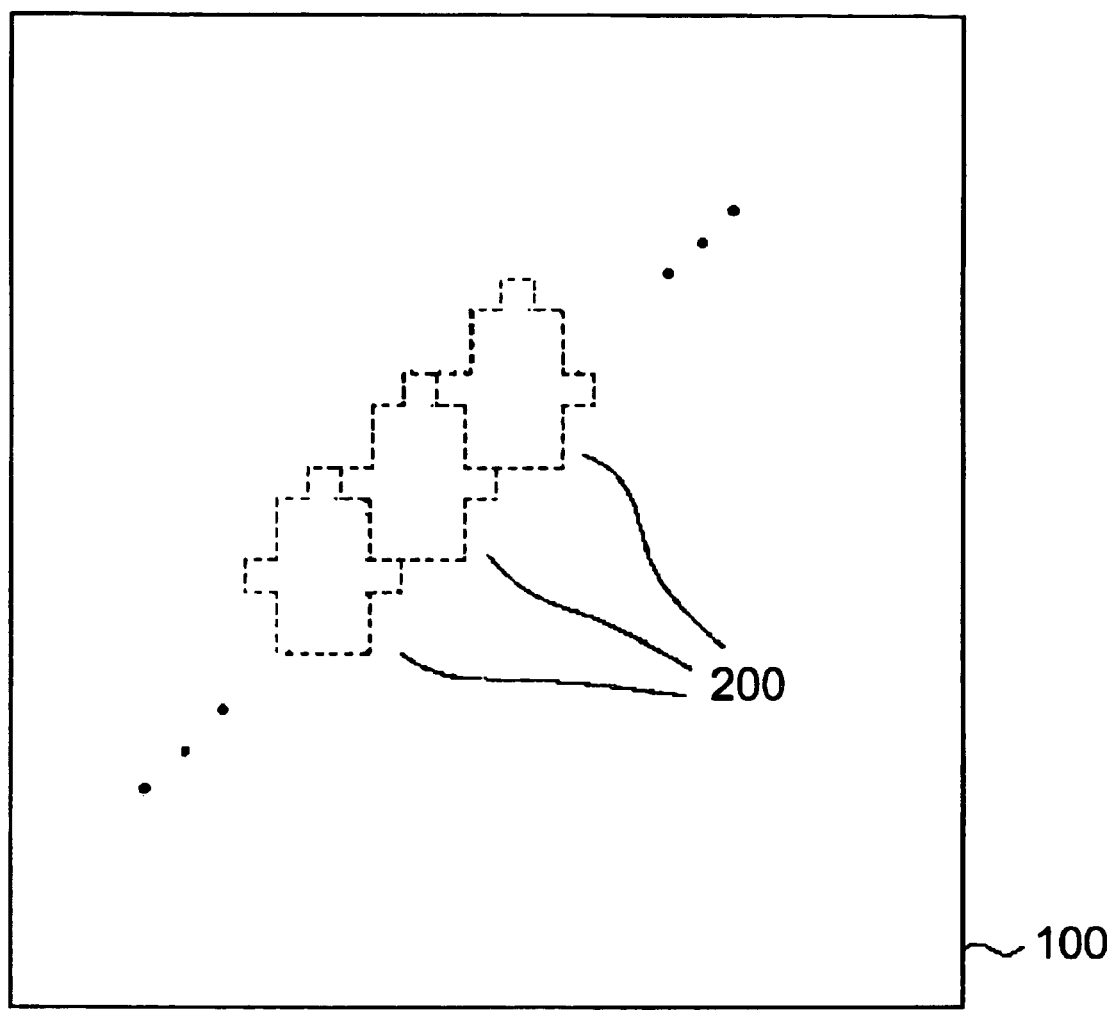
FIG. 18 serves to illustrate cells that are applied to an input image.

The difference in cell inclination between cell blocks for which the inclination between cells is substantially −18° and the cell blocks set at substantially +18° is substantially 30°. As a result, the Moire fringes can be minimized. Further, four cell blocks 251C to 254C (see FIG. 17) for which the inclination between cells is set at substantially +45° are applied as shown in FIG. 18 to three colors among CMYK.

Because the difference in the inclination of the respective cells is substantially 30° between a cell block set at substantially +18° and a cell block set at substantially +45°, an output image in which the so-called Moire fringes are minimized can be obtained. Further, any one of respective −18°, +18°, and 45° cell blocks may be applied to one last color among CMYK or a cell block with an inclination between these angles (0° or the like, for example) may be applied.

When this is compared with conventional halftone dot processing, according to the present invention, halftone dots (or dots) having the same grayscale values as the total of the grayscale values contained in the cells are generated and dots are generated in the positions of the reference point of the respective cells. For this reason, the reproducibility of thin lines and edges and so forth increases and jaggies are not produced, whereby small and thin text is easy to read and a halftone dot image of a high resolution can be generated. An output image that is faithful to the input grayscale values can be obtained.

The following effects are obtained with the abovementioned embodiment.

In the present invention, the total of the grayscale values of the pixels contained in the cells is found and, in cases of grayscale values that are less than the grayscale values corresponding with a favorable dot size that can be outputted by a printing apparatus, the input lacking grayscale values are collected from unprocessed pixels in the periphery by means of a pixel group expansion processing unit 65 to generate dots of a size that corresponds with grayscale values that have accumulated at a time when thoroughly favorable grayscale values have accumulated. Therefore, an error with the grayscale values is not produced by the cell-unit quantization processing.

Further, because dots are generated by considering the positions of reference points in a grayscale value distribution in the cells in the present invention, an output that is faithful to the distribution of the input grayscale values is obtained.

In summary of the effects above, even with a printing apparatus that comprises a stable pulse width control apparatus that does not permit fine control, an output showing smooth grayscales that is faithful to the input can be obtained.

Further, because dot generation processing is performed after the lacking grayscale value component that is less than the minimum dot size enabling an output to be made stably by the printing apparatus has been collected from peripheral unprocessed pixels, a grayscale-value error is not produced in the processing of each cell. Further, although, with conventional methods, a drop in resolution and granularity has been unavoidable on account of the need for a dot interval at or above a certain interval, in the case of the present invention, because the cells are fixed and the optimum dot interval corresponding with a dot size that enables a stable output is maintained, deterioration of resolution and granularity is kept to a minimum.

Thus, even in highlight areas in which, with conventional image processing methods, dot reproduction was unstable and inconsistencies readily occurred, smooth and stable grayscale production with superior granularity is possible.

Further, in parts in which there is variation in the input image, dots are generated by considering the positions of reference points in an in-cell grayscale value distribution and, therefore, variation in the input data can be faithfully reproduced. More particularly, the reproducibility of edges and narrow lines and so forth and of thin color text in particular increases and the resolution and readability of text can be improved.

Further, by rendering the difference in the angle forming the cell arrangement direction and the cell formation substantially 30°, it is also possible to suppress the production of Moire between colors.

An embodiment of the present invention was described above. However, the present invention is not limited to such an embodiment and can be implemented in a variety of forms in the range not departing from the spirit of the present invention. Modified examples are offered and described below.

FIRST MODIFIED EXAMPLE

A first modified example of the present invention will now be described. In this embodiment, in cases where a dot with a value 15 is generated in the pixel (column 1, row 3) in FIG. 8C, the lacking component of the closest pulse width 32 is the unprocessed pixels in the periphery of the cells and is described as being captured from the pixels closest to the reference point. However, conversely, the values of the pixel (column 1, row 3) may be passed over to the closest pixel to the reference point. In this case, the value of the pixel (column 1, row 3) is 0, the value of the pixel (column 3, row 4) is 20+15=35 and is handled as an unprocessed pixel.

SECOND MODIFIED EXAMPLE

The second modified example of the present invention will now be described. The description of this embodiment described dots as being set for pixels containing the position of the reference point in step S202 in FIG. 6. However, in a case where the reference point is (0.5, 0.5) in the input buffer 72 in FIG. 7A, for example, it cannot be judged in which pixel of the pixels (column 0, row 0), (column 1, row 1), and (column 1, row 1) the reference point is contained. In such a case, the pixel (column 0, row 0) with the reference point in the bottom right-hand corner may be selected, for example.

THIRD MODIFIED EXAMPLE

The third modified example of the present invention will now be described. The image processing apparatus of this embodiment is constituted as a laser printer. However, the present invention is not limited to a laser printer and may be constituted by means of a variety of printers such as a thermal printer or a printer of a system that performs printing by causing ink to adhere to a print medium such as an inkjet printer, or by means of an electronic photograph or a display. Alternatively, a variety of devices such as a copier, computer, word processor, or fax machine that incorporate such a printer may constitute the image processing apparatus of the present invention

What is claimed is:

1. An image processing apparatus that converts input image data to output image data having two or more types of quantization data and outputs the output image data, comprising:
   a pixel group reference point determination unit that divides the input image data into predetermined pixel groups and determines a position of a reference point from grayscale values of respective pixels contained in the pixel groups;
   a pixel group expansion processor that takes the grayscale values of the part that is less than a threshold value from unprocessed pixels in periphery of the pixel group into the pixel group, if total of the grayscale values of the respective pixels contained in the pixel group is less than the threshold value based on each of values of the quantization data; and
   a quantization data supply unit that supplies the quantization data to a pixel on the basis of the position of the reference point determined by the pixel group reference point determination unit.

2. An image processing apparatus that converts input image data to output image data having two or more types of quantization data and outputs the output image data, comprising:
   a pixel group reference point determination unit that divides the input image data into predetermined pixel groups and determines a position of a reference point from grayscale values of respective pixels contained in the pixel groups;
   a pixel group expansion processor that takes grayscale values of the part that is less than a threshold value from unprocessed pixels in periphery of the pixel group into the pixel group, if total of the grayscale values of the respective pixels contained in the pixel group is less than the threshold value based on each of values of the quantization data;
   a quantization data supply unit that supplies the quantization data to a pixel on the basis of the position of the reference point determined by the pixel group reference point determination unit; and
   a pulse width modulation unit that generates a pulse width of the K stages (K is a positive integer) in accordance with the quantization data supplied by the quantization data supply unit.

3. The image processing apparatus according to claim 1 or 2, wherein the pixel group reference point determination unit calculates the product of the pixel positions of the respective pixels and the grayscale values of the respective pixels for all the pixels contained in the pixel group, and determines a value in which a total of the product is divided in the total value of the grayscale values of the respective pixels contained in the pixel group as the position of the reference point.

4. The image processing apparatus according to claim 3, wherein the pixel group expansion processor takes grayscale values of the unprocessed pixels which is closest position of the reference point determined by the pixel group reference point determination unit into the pixel group.

5. The image processing apparatus according to claim 4, wherein the pixel group reference point determination unit re-determines a position of the reference point on the basis of the pixel position and grayscale values of taken-into unprocessed pixels each time the pixel group expansion processing unit takes the grayscale values of the unprocessed pixels in periphery of the pixel group.

6. The image processing apparatus according to claim 5, wherein the quantization data supply unit selects preferentially from the closest pixels to the position of the reference point, and supplies the quantization data to the selected pixels.

7. The image processing apparatus according to claim 6, wherein the quantization data supply unit supplies a remainder value to the closest pixel from the position of the reference point which is a pixel other than the pixels to which the quantization data is supplied, if the quantization data supply unit supplies the quantization data to the pixel closest to the position of the reference point, in cases where there is the remainder value by subtracting the supplied quantization data from the total value of the grayscale values of the respective pixels contained in the pixel group.

8. The image processing apparatus according to claim 7, wherein the pixel group expansion processing unit takes grayscale values of the part that is less than the threshold value from unprocessed pixels in periphery of the pixel group into the pixel group, if the grayscale value of the pixel to which the remainder value is supplied by the quantization data supply unit is less than the threshold value.

9. An image processing apparatus that converts input image data of a plurality of colors to output image data having two or more types of quantization data, comprising:
   a pixel group reference point determination unit that divides the input image data into predetermined pixel groups and determines a position of a reference point from grayscale values of respective pixels contained in the pixel groups;
   a pixel group expansion processor that takes grayscale values of the part that is less than a threshold value from unprocessed pixels in periphery of the pixel group into the pixel group, if total of the grayscale values of the respective pixels contained in the pixel group is less than the threshold value based on each of values of the quantization data; and
   a quantization data supply unit that supplies the quantization data to a pixel on the basis of the position of the reference point determined by the pixel group reference point determination unit,
   wherein the difference of angle forming arrangement direction of the pixel group between any two colors among the plurality of colors is substantially 30°.

* * * * *